United States Patent [19]

Suzuki et al.

[11] 4,299,549
[45] Nov. 10, 1981

[54] HEATING BLOW-MOLDING MACHINE

[75] Inventors: Sadao Suzuki, Tokyo; Yoshiyuki Ichizawa, Sohka; Nobuichi Seki, Tokyo, all of Japan

[73] Assignee: Yoshino Kogyosho Co., Ltd., Tokyo, Japan

[21] Appl. No.: 103,911

[22] Filed: Dec. 17, 1979

[30] Foreign Application Priority Data

Dec. 28, 1978 [JP] Japan .................. 53/162047

[51] Int. Cl.$^3$ .................................... B29C 17/07
[52] U.S. Cl. ............................ 425/214; 264/535; 425/526; 425/534; 425/539; 425/540
[58] Field of Search ............ 425/526, 529, 534, 538, 425/539, 540, 214; 264/532, 535

[56] References Cited

U.S. PATENT DOCUMENTS 3,599,280  8/1971  Rosenkranz et al. ............ 425/526 X
4,214,860  7/1980  Kleimenhagen et al. ......... 425/526 X

FOREIGN PATENT DOCUMENTS 2856132  7/1979  Fed. Rep. of Germany ...... 425/533

*Primary Examiner*—Jan H. Silbaugh
*Attorney, Agent, or Firm*—Stevens, Davis, Miller & Mosher

[57] ABSTRACT

This heating blow-molding machine fabricates a number of bottle-shaped containers from biaxially oriented plastic pieces or parisons by supplying the plastic pieces to a heating unit to heat them to the orientation temperature and then supplying them to 12-station rotary blow molding machine for biaxial orientation. Each of the plastic pieces or parisons is made of polyethylene terephthalate resin to provide a thin-walled transparent bottle-shaped container of cylindrical shape with one bottom and a prefinished neck portion injection molded simultaneously in numerous number by an injection molding machine. This blow-molding machine consists of a turntable for the heating unit, a turntable for a blow-molding machine, and a turntable for loading and unloading the pieces and the products blow-molded from the pieces. Each of the turntables is continuously turned in predetermined direction at an intrinsic speed set with respect to the number of stations provided thereat, the time required for heating the pieces, and another time required for blow-molding and cooling the pieces, etc. Further, a rotor is employed to transfer the pieces or container products between the turntables rotated at their intrinsic speeds, respectively. The rotor is rotated according to a speed curve at a moving speed equal to the peripheral speed of the turntable opposite to the turntable for transferring the pieces held thereby at the holding portions.

7 Claims, 28 Drawing Figures

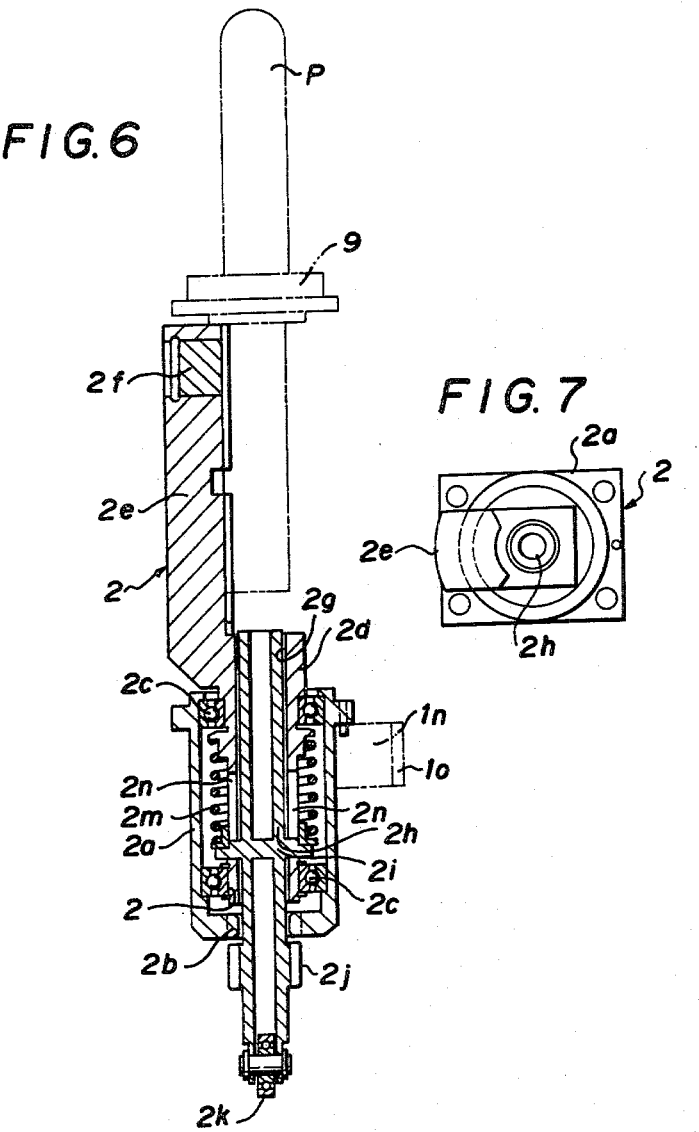

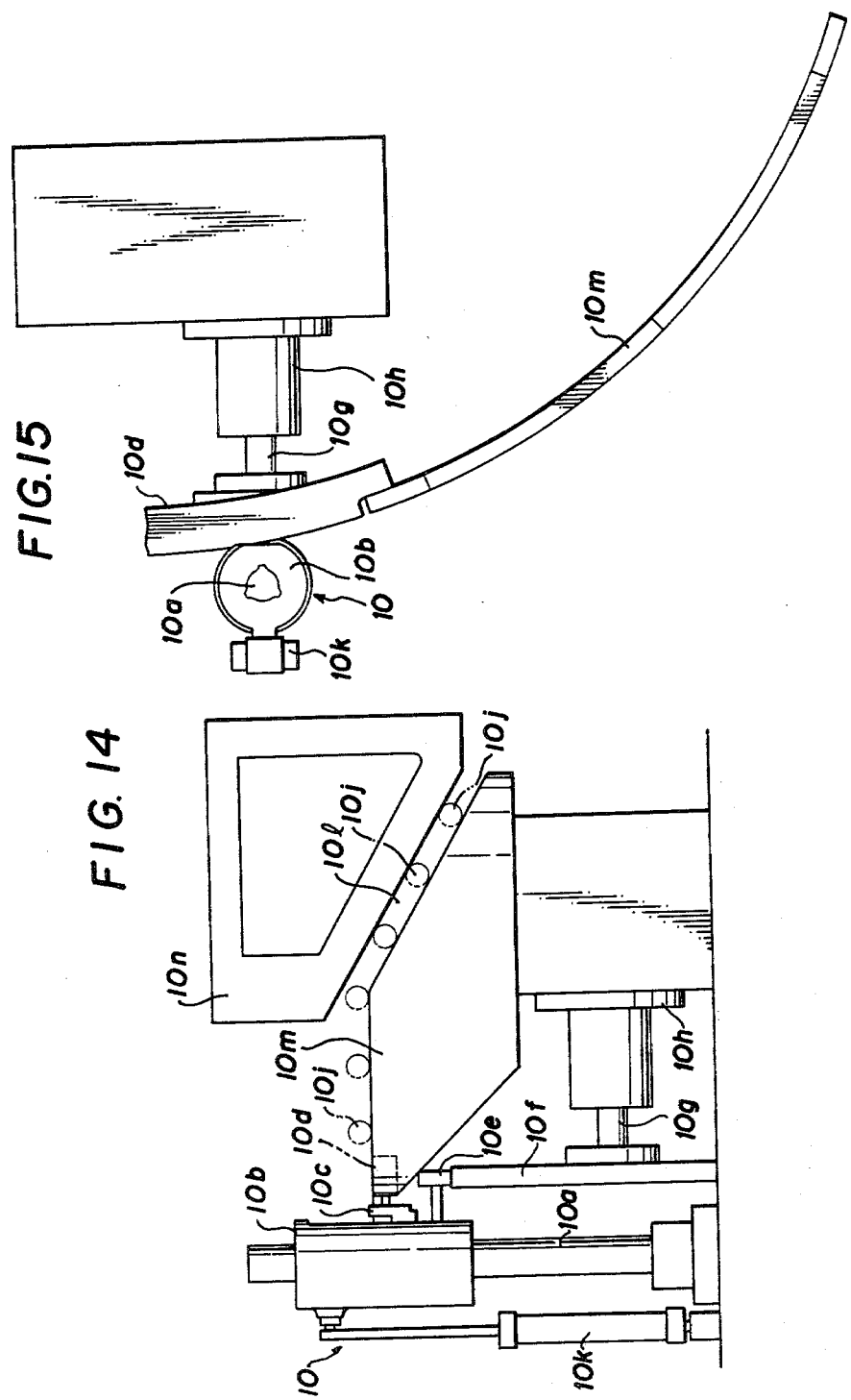

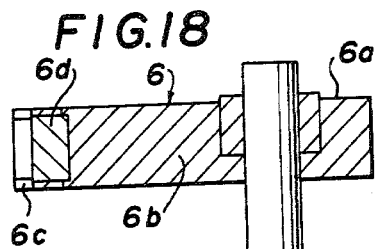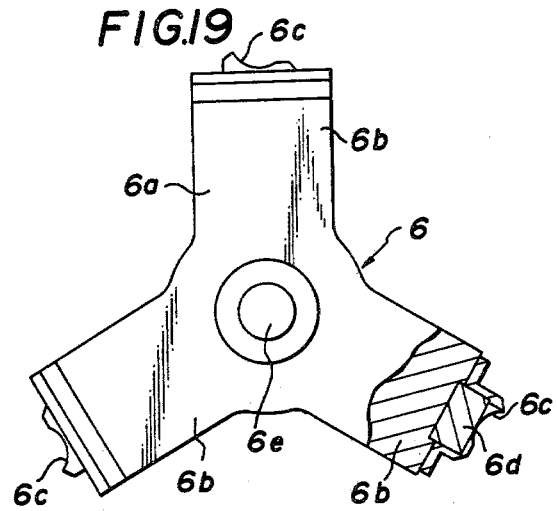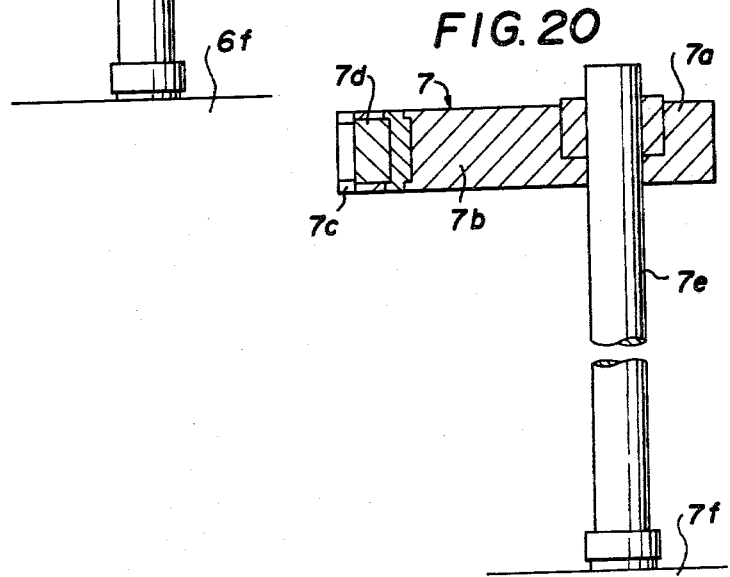

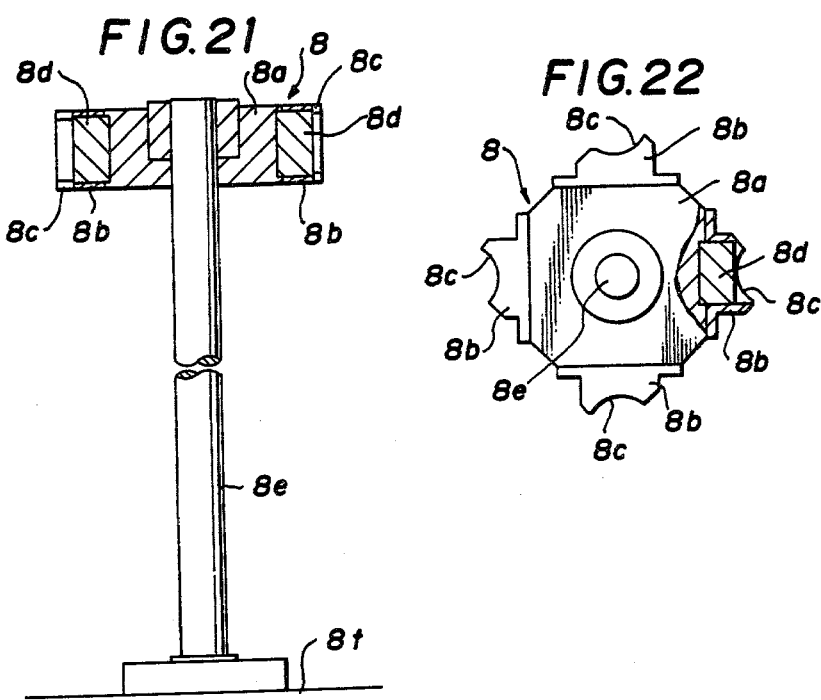

HEATING BLOW-MOLDING MACHINE

BACKGROUND OF THE INVENTION

This invention relates to a rotary heating blow-molding machine for fabricating a bottle-shaped container of biaxially oriented synthetic resin such as plastic and, more particularly, to a blow-molding machine for fabricating a thin-walled transparent high-impact plastic container of high molding accuracy by orientation-blowing synthetic resin such as polyethylene terephthalate.

In an ordinary process for molding a blow-molded bottle-shaped container of biaxially oriented synthetic resin, there is generally adopted a process for blow-molding the container by the steps of extrusion-molding a cylindrical preformed piece or parison in an extrusion molding machine, engaging the parison thus extrusion-molded in split blowing molds and cutting it in predetermined length, and blowing compressed fluid (generally air) into the parison thus engaged to thereby expand the parison thus engaged in the split molds so as to thus blow-mold a bottle-shaped container.

In such a process, however, the parison thus blow-molded into a bottle-shaped container is only radially oriented uniaxially, but is not oriented in the axial direction at all.

An injection blow molding process is utilized to eliminate the disadvantages of the above described extrusion blow molding process.

This injection blow molding process blow-molds a bottle-shaped container by the steps of orienting a preformed piece of cylindrical shape with a bottom preformed by an injection molding machine or by an extrusion molding machine in a blowing mold and introducing compressed fluid or air into the blow mold to thereby radially orient the piece. According to the injection blow molding process, since the molded product is biaxially oriented, it can be sufficiently oriented to improve various mechanical properties such as durability and mechanical strength and transparency.

In case where the preformed piece is molded by an injection molding process, the degree of the viscosity of synthetic resin material used for the preformed piece does not become a problem. Since the process can, however, employ synthetic resin having good moldability and low viscosity such as, for example, saturated polyester resin, it can freely select and use synthetic resin material having adequate physical properties for the intended purpose as a bottle.

The most general example of carrying out the injection blow molding process installs separately an injection molding machine and a blow-molding machine and thus fabricates a blow-molded product by the steps of conveying a preformed piece molded in the injection molding machine into the blow-molding machine, uniformly heating the preformed piece cooled at separating and conveying time from the injection molding machine to the temperature capable of biaxially orienting it before setting it in the blow-molding machine, and then setting the piece thus uniformly heated in the blow-molding machine to thereby blow-mold the piece into the final product.

There are various types of a heating blow-molding machine having the blow-molding machine and a heating unit in combination. The typical fundamental constitution of such a heating blow-molding machine incorporates a heating unit and a blow-molding machine of turntable construction and fabricates a product by the steps of uniformly heating numerous preformed pieces while rotating the pieces around a center thereof, sequentially feeding the pieces thus heated to a blow-molding machine, engaging the pieces thus heated one by one with numerous blowing molds rotating around a center as attached to a turntable in the blow-molding machine, and orientating blow-molding the pieces thus engaged and discharging the pieces.

The operations of feeding the pieces to the blow-molding machine and conveying the pieces or final products between the turntables are automatically controlled at a set time period upon stoppage of the respective turntables by intermittently turning the turntables of the heating unit and blow-molding machine at every predetermined interval of central angle.

Since the turntables are thus intermittently rotated, this heating blow-molding machine can easily take a timing for feeding the pieces and the final products betwen the turntables to thus easily center the pieces and the products in the conveyance, however since the pieces and the products are thus intermittently fed, the heating blow-molding machine can fabricate fewer pieces and products per unit time, namely less productivity with bulky, complicated and expensive facilities. Further, the intermittent rotation and operation of the heating blow-molding machine vigorously wears the respective portions, particularly bearings and braking units, and results in a great deal of vibration, thus causing serious disadvantages.

SUMMARY OF THE INVENTION

Accordingly, a primary object of the present invention is to provide a heating blow-molding machine which eliminates the aforementioned disadvantages of the conventional machine and can fabricate numerous preformed pieces per unit time in high productivity such as approx. twice the conventional moldability.

It is another object of the present invention to provide a heating blow-molding machine which can convey the pieces and final products smoothly without vibration so as to eliminate auxiliary units such as brake units, buffer units and timing position correcting units to thereby simplify the constitution thereof to cause less malfunction.

It is still another object of the present invention to provide a heating blow-molding machine which can simplify the conveying or feeding operation of the pieces and final products between adjacent units without complicated structure.

It is still another object of the invention to provide a heating blow-molding machine which can take readily a timing operation by means of common input from the single output of one reduction gear.

The present invention provides a heating blow-molding machine which conveys to circulate a number of jigs such as orientation jigs, from a piece loading and unloading unit of rotary table structure through a heating unit of rotary table structure to a biaxially orientation blow molding machine of rotary table structure, from which the jigs are again conveyed to be circulated to the piece loading and unloading unit. The machine supports synthetic resin pieces of cylindrical shape, each with a bottom, by the respective jigs in neck downward position at the loading position of the piece loading and unloading unit, heats the pieces uniformly at a temperature capable of orienting the pieces by the heating unit, then biaxially orientation blow-molds the pieces into final products as bottle-shaped containers by the blow molding machine, and unloads the products of the bottle-shaped containers from the piece loading and unloading unit as the unloading position.

According to one aspect of the present invention, the turntables in the heating unit, blow-molding machine and piece loading and unloading unit in the heating blow-molding machine are continuously turned in predetermined directions at respective intrinsic constant speeds determined by considering, for example, the numbers of the stations of the respective turntables, times required for heating the pieces, and another times required for orienting, blowing and cooling the pieces. Rotors are employed to load and unload the pieces or products among the respective turntables rotating at the respective intrinsic constant speeds and are so set as to rotate according to a predetermined speed curve at speeds equal to the peripheral speed of the turntables facing each other i.e. at the moving speeds of the respective stations when the stations reach the transfer position of the pieces or products to the opposite turntables, respectively.

BRIEF DESCRIPTION OF THE DRAWINGS

The foregoing objects and other objects as well as the characteristic features of the invention will become more apparent and more readily understandable by the following description and the appended claims when read in conjunction with the accompanying drawings.

FIG. 6 is a longitudinal sectional view of the jig holder of the apparatus,

FIG. 7 is a plan view of the jig holder in FIG. 6;

FIGS. 8 and 9 are views of part of the position controller, wherein FIG. 8 is a plan view, and FIG. 9 is a side view;

FIGS. 11 and 12 are vertical sectional views of the jig holder with the blow-molding machine, wherein FIG. 11 is the state that the piece is axially oriented, and FIG. 12 is the state that compressed air is introduced into the piece to be radially oriented;

FIGS. 13 to 15 are views of the orientation cam unit of the apparatus, wherein FIG. 13 is a side view of the assembled disposition with the blow molding machine, FIG. 14 is a side view of the passage, and FIG. 15 is a plan view;

FIGS. 18 and 19 are views of the loading unit, wherein FIG. 18 is a side view partly in section, and FIG. 19 is a plan view partly fragmented;

FIG. 20 is a side view of the unloading unit partly in section;

FIGS. 21 and 22 are views of the transfer means, wherein FIG. 21 is a side view partly in section, and FIG. 22 is a plan view partly fragmented;

FIGS. 23 to 28 are explanatory views of the transfer operation of the jig, wherein FIG. 23 is a graphical representation showing the operation modes and the timing of the loading unit, unloading unit, and transfer means with respect to the rotating speed change of the rotor, FIG. 24 is a view of the state at the timing $t_1$ shown in FIG. 23, FIG. 25 is a view of the state at the timing $t_2$ shown in FIG. 23, FIG. 26 is a view of the state at timing $t_3$ shown in FIG. 23, FIG. 27 is a view of the state at the timing $t_4$ shown in FIG. 23, and FIG. 28 is a view of the state at the timing $t_5$ shown in FIG. 23.

DESCRIPTION OF THE PREFERRED EMBODIMENTS

Figure 1:
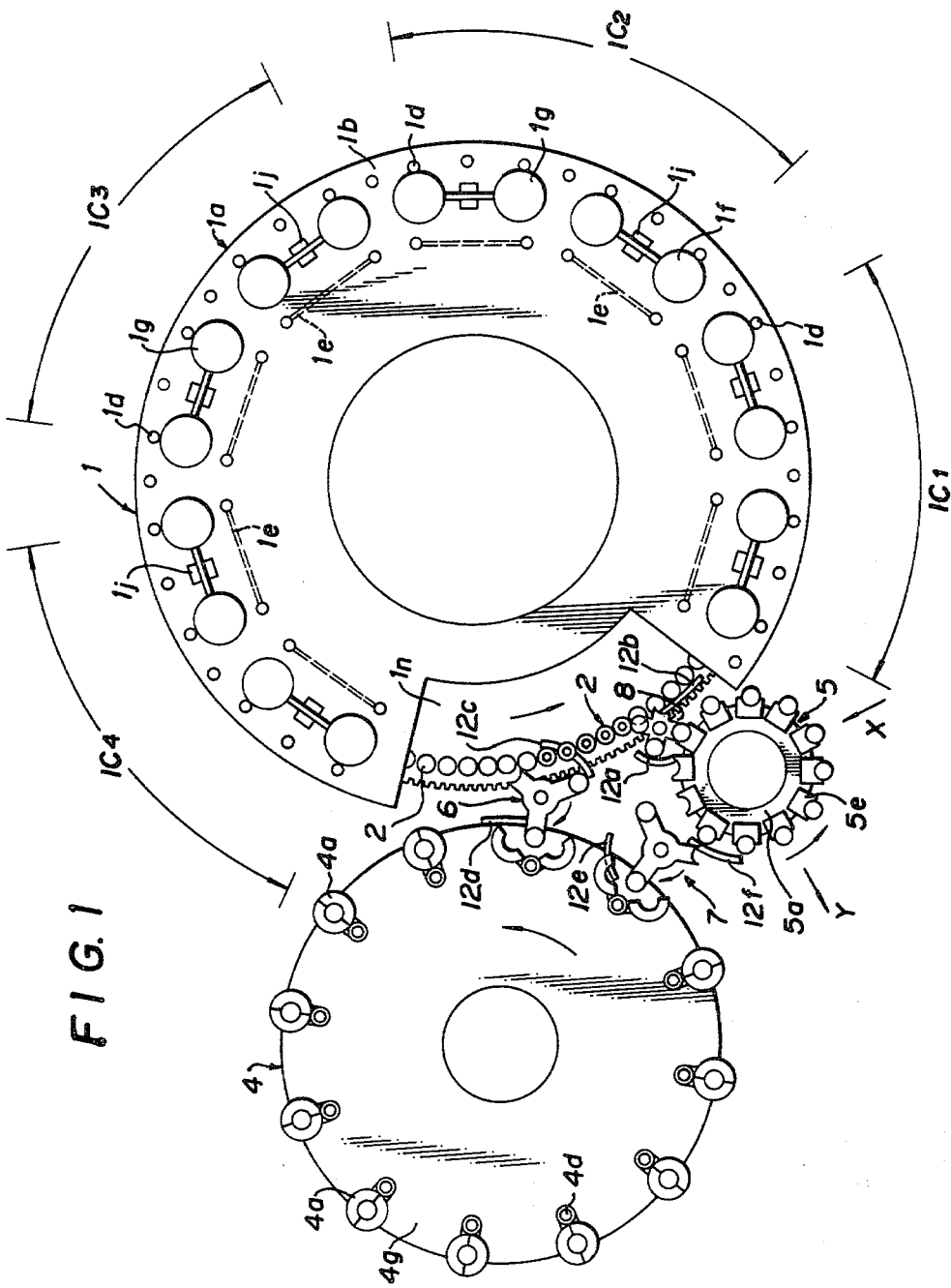
FIG. 1 is a plan view showing the plan disposition of the essential components and units of the apparatus constructed according to the present invention.

Reference is made to the drawings, particularly to FIG. 1 showing the overall heating blow-molding machine constructed according to the present invention, wherein like reference numerals designate the same parts in the following views.

The heating blow-molding machine of this invention consists essentially of a piece loading and unloading unit 5 which sequentially continuously receives the pieces P injection-molded as preformed material in neck downward position and unloads the container products S such as bottle-shaped containers out of the machine, a heating unit 1 for heating the sequentially fed pieces P uniformly to the temperature adapted for the biaxially orientation blow molding, and a biaxially orientation blow molding machine 4 for biaxially orienting the pieces P uniformly heated to predetermined temperature to blow mold them into container products S. All of these heating unit 1, machine 4, and loading and unloading unit 5 are constructed in turntable shape. The heating unit 1 has a turntable 1n, a number of jig holders 2 installed at equi-distant interval at the peripheral edge of the turntable 1n, and a number of jigs 9 held at the respective jig holders 2 for holding the pieces P in neck downward position. The biaxially orientation blow molding machine 4 has a turntable 4g and a number of blowing molds 4a disposed equi-distantly at the peripheral edge of the turntable 4g for holding the respective jigs 9 upon closing thereof. Further, the loading and unloading unit 5 has a turntable 5a and a number of holding pieces 5e disposed equi-distantly at the peripheral edge of the turntable 5a for holding the respective jigs 9 therewith.

The turntables 1n, 4g and 5a of the respective heating unit 1, machine 4, and loading and unloading unit 5 are continuously rotated at intrinsic constant speeds, respectively.

The jigs 9 for holding the pieces P or the products S are transferred among the heating unit 1, blow molding machine 4, and loading and unloading unit 5, and are circulatingly conveyed thereamong. Thus, the pieces P supported at the respective jigs 9 are heated, biaxially orientation blow molded, and unloaded. There are also provided a loader 6 for transferring the jigs 9 from the heating unit 1 to the blow molding machine 4, an unloader 7 for transferring the jigs 9 from the blow molding machine 4 to the loading and unloading unit 5, and transfer means 8 for transferring the jigs 9 from the loading and unloading unit 5 to the heating unit 1.

The loader 6, unloader 7, and transfer means all three of which transfer jigs between turntables, 8 incorporate rotors 6a, 7a, and 8a, respectively, which have holding arms 6b, 7b, and 8b, respectively for holding the jigs 9. The rotors 6a, 7a, and 8a are so set as to rotate according to a predetermined speed curve at the speed equal to the peripheral speed of the oppposite turntables 1n, 4g, and 5a facing with each other, so that the moving speeds of the respective holding arms 6b, 7b, and 8b allow the arms 6b, 7b, and 8b reach the transfer position to the opposite turntables 1n, 4g, and 5a, respectively.

Accordingly, since the holding arms 6b of the rotor 6a of the loader 6 rotate, for example, at the speed different from that of the turntables 1n and 4g, they must be selectively set so that a plurality of the arms 6b may not simultaneously face with the turntables 1n and 4g.

It is noted that, although the numbers of the holding arms 6b, 7b, 8b are not particularly limited at the respective rotors 6a 7a, and 8a, they are set to the number for smoothly rotating the rotors 6a, 7a, and 8a corresponding to the speed difference among the turntables 1n, 4g, and 5a facing with each other.

In the embodiment shown, as is clear from FIG. 1, the loader 6 and unloader 7 incorporate three holding arms 6b, and 7b, respectively, and the transfer means 8 accommodates four holding arms 8b.

It is noted that there are close relationships between the numbers of the holding arms 6b, 7b, and 8b of the loader 6, unloader 7, and transfer means 8 and the turning speeds of the respective turntables 1n, 4g, and 5a. More particularly, the relationship between the turning speeds of the respective turntables 1n, 4g, and 5a and the numbers of the holding arms 6b, 7b, and 8b must be so set in the case of the turntable 1n that the pieces P cooled to the room temperature should be disposed within the heating chamber 1a for a time such that they are uniformly heated to the temperature capable of regular biaxial orientation. The relationship should also be set in the case of the turntable 4g with respect to the rotating speed thereof in term of the number of the jig holders 2 so that the pieces P must be disposed within the blowing molds 4a for a time while they are sufficiently solidified by cooling after biaxially orientation blow molding. In addition, the relationship must also be so set in case of the turntable 5a with respect to the number of the molds 4a that the turning speed thereof must be adapted for those of both the turntables 1n and 4g at the speed for sufficiently receiving the pieces P and unloading the products S.

As was heretofore described, it is noted that the respective units of the present invention such as the turntable 1n in the heating unit 1, turntable 4g in the blow-molding machine 4, turntable 5a in the piece loading and unloading unit 5, rotor 6a in the loader 6, rotor 7a in the unloader 7 and rotor 8a in the transfer means 8 are rotated at the respective intrinsic speeds according to the predetermined speed curves, which speeds and the curves are not independent from each other, but are set mutually in predetermined relationship within respective allowable ranges.

The units composed in the heating blow-molding machine of the present invention will further be described in detail with reference to the drawings.

In FIG. 1, which is particularly referred to hereinafter, the jigs 9 are loaded by the loader 6 to the blow-molding machine 4 and are unloaded by the unloader 7 from the blow-molding machine 4 as exemplified. The heating unit 1 incorporates a turntable 1n in which 90 jig holders 2 are equi-distantly installed at the peripheral edge thereof, and the biaxially orientation blow molding machine 4 incorporates a turntable 4g in which 12 blowing molds 4a are equi-distantly disposed at the peripheral edge thereof. The piece loading and unloading unit 5 incorporates a turntable 5a in which 12 holding pieces 5c are equi-distantly disposed at the peripheral edge thereof for holding the respective jigs 9. The turntable 1n is the largest in diameter, the turntable 4g is next, and the turntable 5a is the smallest.

The turning speeds of the respective turntables 1n, 4g, 5a are so set when loading and unloading the jigs 9 among the respective turntables 1n, 4g, 5a that, when one turntable loads one jig 9, it unloads one jig 9 already held thereby, additionally considering the time required for uniformly heating the entire piece P at a temperature adapted for the biaxially orientation blow molding and the time required for cooling and solidifying the product S biaxially-oriented and blow-molded.

In case as exemplifed in FIG. 1, the turntable 4g turns at the fastest speed $V_1$, the turntable 5a turns next at $V_2$, and the turntable 1n turns at the slowest speed $V_3$.

At predetermined desired position where the turntable 1n of the heating unit 1 approaches the turntable 4g of the blow-molding machine 4 is disposed the loader 6 having three holding arms 6b, which loader 6 transfers the jig 9 holding the piece P uniformly heated at predetermined temperature from the heating unit 1 to the blow-molding machine 4 by the rotation of the rotor 6a. At predetermined desired position where the turntable 4g of the blow-molding machine 4 approaches the turntable 5a of the piece loading and unloading unit 5 is disposed the unloader 7 having three holding arms 7b, which unloader 7 transfers the jig 9 holding the product S such as a bottle-shaped container biaxially oriented and blow-molded and cooled by the rotation of the rotor 7a from the blow-molding machine 4 to the piece loading and unloading unit 5. Further, at predetermined desired position where the turntable 5a approaches the turntable 1n is disposed the transfer means 8 having four holding arms 8b, which means 8 transfers the jig 9 holding the piece P of neck downward position attitude supplied from the injection molding machine (not shown) by the rotation of the rotor 8a from the piece loading and unloading unit 5 to the heating unit 1.

There are provided guide plates 12a, 12b, 12c, 12d, 12e, 12f at the loading positions of the jigs 9 from the turntables 1n, 4g, 5a and at the unloading positions of the jigs 9 to the turntables 1n, 4g, 5a by means of the loader 6, unloader 7, and transfer means 8, respectively to perform exact piece or product loading and unloading operations. These guide plates 12a, 12b, 12c, 12d, 12e, 12f are so disposed along the rotating path of the turntable for loading the jigs 9 and as to partially cross the rotating path of the turntable for unloading the jigs 9.

Accordingly, even if a certain jig 9 is not held exactly by both sides of the turntables at the loading and unloading position due to any reason, it is exactly held at the unloading side of the turntable by the operation of the guide plates 12a to 12f.

It is naturally noted that the turntables 1n, 4g, 5a and the rotors 6a, 7a, 8a are so set as to turn and rotate in the same direction among the facing turntables at the peripheral edges thereof to move therealong.

Figure 2:
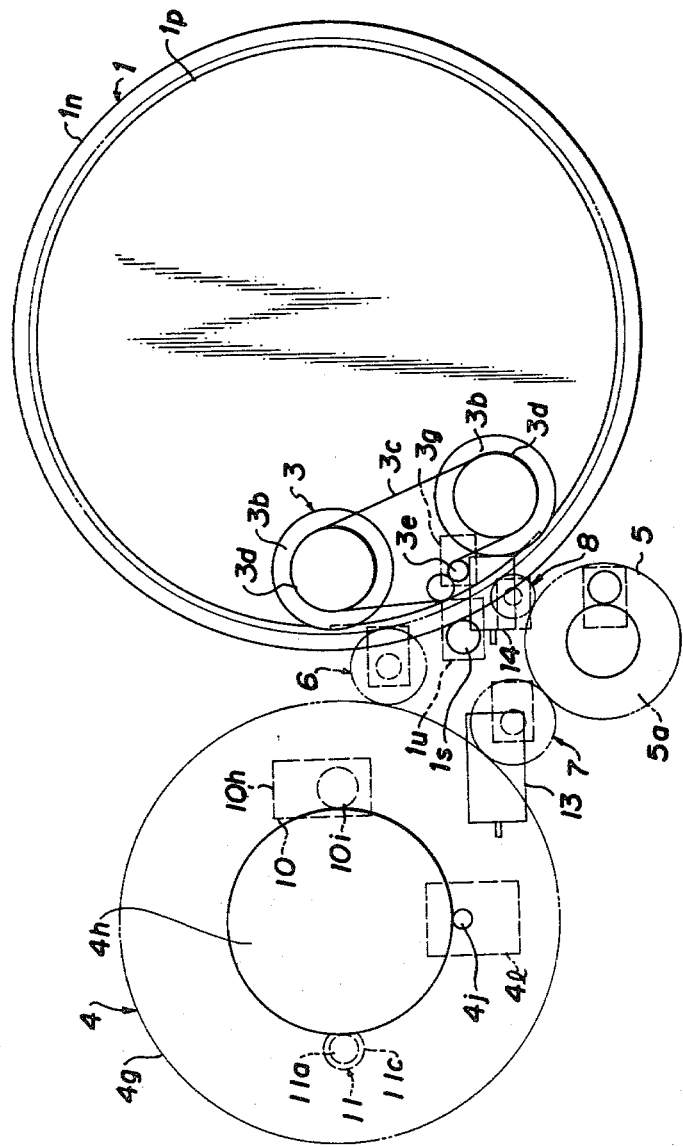
FIG. 2 is a schematic plan view of the disposition of the essential units forming the apparatus in driving relationship thereamong.
Figure 3:
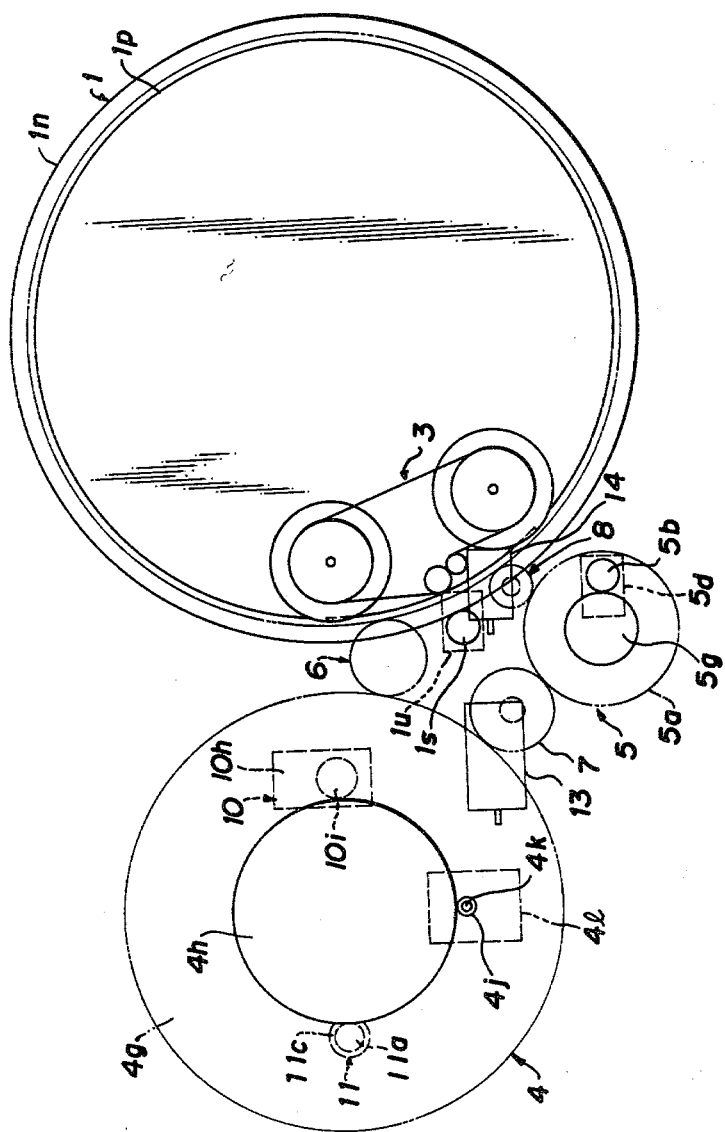
FIG. 3 is a partial schematic plan view of the gear reduction relations shown in FIG. 2.
Figure 4:
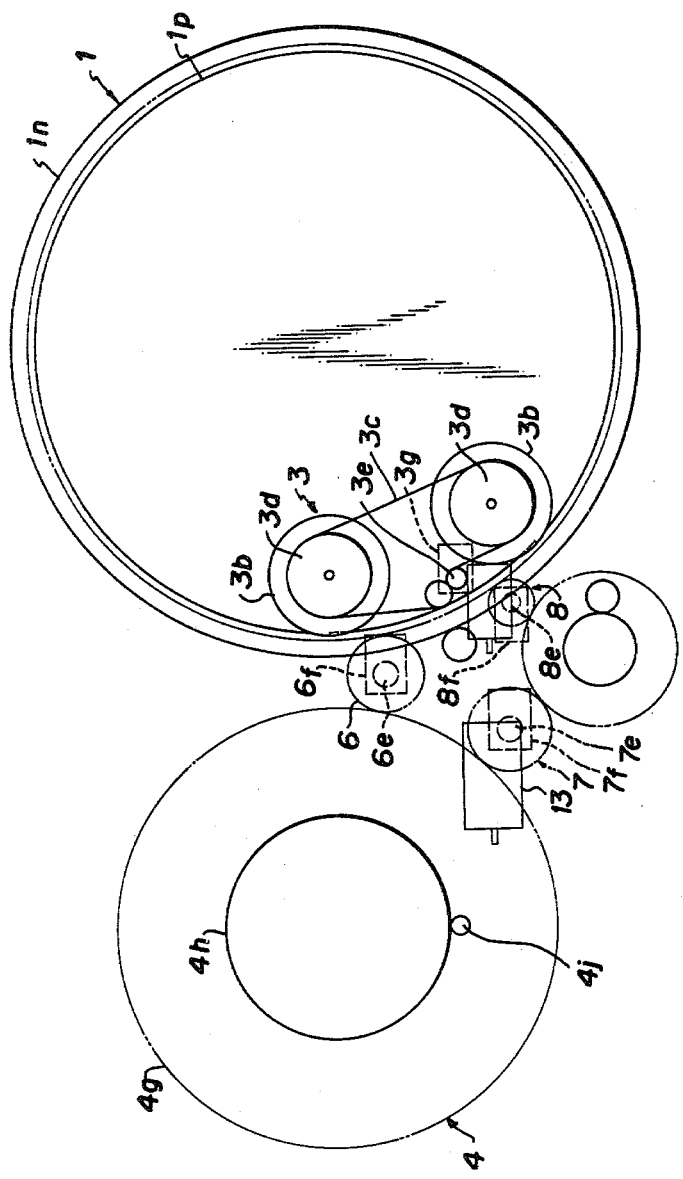
FIG. 4 is a schematic plan view of the cam unit relations shown in FIG. 2.
Figure 5:
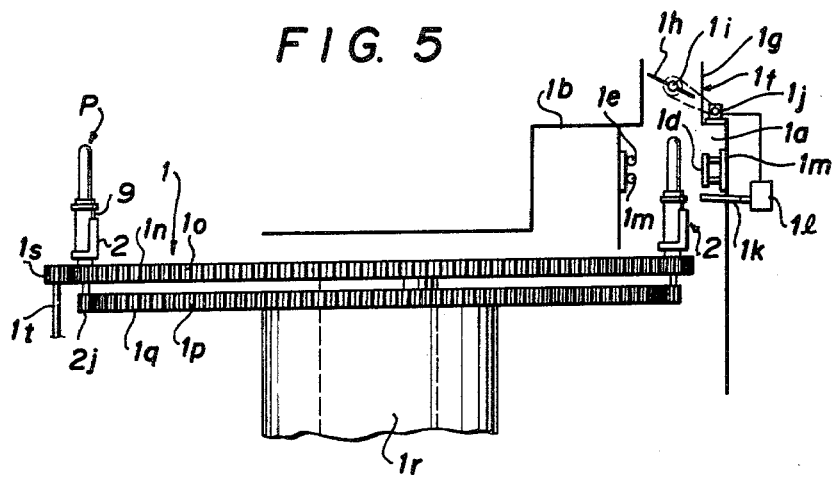
FIG. 5 is a side view, partially fragmentarily shown, of the simplified heating unit of the apparatus.

FIGS. 2 to 4 show the disposition of the rotary drive sources of the turntables 1n, 4g, and 5a and the rotors 6a, 7a, and 8a, respectively.

In FIGS. 2 to 4, the numeral 3 generally designates a position controller for holding the jig holders 3 provided at the turntable 1n in predetermined position capable of easily receiving the pieces P and unloading the products S.

As obviously seen from FIG. 3, all the rotary drive forces are produced by a motor 13. The turntable 1n is rotarily driven through a rack 10 with teeth formed at the peripheral edge engaged with a drive gear 1s installed on the output shaft of a reduction gear 1u engaged via a reduction gear 14 with a motor 13. The rotating force of the motor 13 is also transmitted through the reduction gear 14 to a reduction gear 5d. The turntable 5a is rotarily driven by the engagement of the output shaft 5c of the reduction gear 5d via a drive gear 5b secured to the gear 5d with the peripheral end of a rack disk 5g. Further, the turntable 4g is rotarily driven by transmitting the rotary force of the motor 13 directly to a reduction gear 41 and engaging a drive gear 4j secured to the output shaft 4k of the reduction gear 41 with peripheral end of a rack table 4h integrally formed with the turntable 4g.

The rotors 6a, 7a, and 8a of the loader 6, unloader 7, and transfer means 8 are rotarily driven via the reduction gear 14 with respect to the respective turntables 1n, 4g, and 5a. As was previously described, the rotating speed curves of the respective rotors 6a, 7a, and 8a depend upon the particular relationship described before.

Thus, the output of the reduction gear 14 is applied through special cam units 6f, 7f, and 8f of the loader 6, unloader 7, and transfer means 8 to provide the respective rotations according to their intrinsic rotation speed curves of the respective rotors 6a, 7a, and 8a.

These cam units 6f, 7f, and 8f alter the rotating speeds of the rotors 6a, 7a, and 8a at predetermined timing by means of the combination of the cams. It should be appreciated that since all the can units 6f, 7f, and 8f are driven by the output of one reduction gear 14, it is very simple to determine the timing of the speed variations thereamong.

According to the present invention as exemplified, the jigs 9 are thus loaded and unloaded to be circulatingly conveyed along predetermined path by means of the rotors 6a, 7a, 8a of the loader 6, unloader 7 and transfer means 8, which respectively rotate, according to the specific rotating speed curve, among the turntables 1n, 4g, 5a of the heating unit 1, blow-molding machine 4 and piece loading and unloading unit 5. The turntables are continuously turned at respective intrinsic speed so that the jigs and pieces are evenly heated, biaxially orientation blow-molded and unloaded from the unit externally as the jigs 9 are conveyed for holding the pieces P in neck downward position attitude. The constructions of the respective units in the heating blow-molding machine of the present invention will now be further described in more detail.

Figure 10:
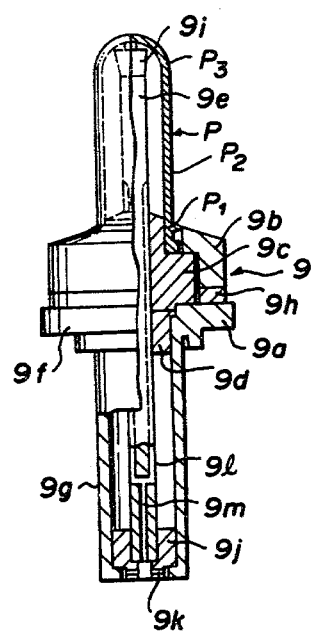
FIG. 10 is a vertical sectional view of the jig holder as used for holding the piece.

As shown in FIG. 10, the piece P injection-molded as a preformed material to be biaxially orientation blow-molded to a product S of bottle-shaped container by the heating blow-molding machine of the present invention is supplied in cooled state to the heating blow-molding machine of this invention.

A collar or flange portion is peripherally formed onto the outer periphery of the neck portion $P_1$ having an opening end for rigidly mounting a cover when blow-molding the piece P into a product S of a bottle-shaped container. This neck portion $P_1$ is attached to the jig 9 for holding the piece P.

The piece P also incorporates a body portion $P_2$ formed under the neck portion $P_1$ to become the body of the final product S as a bottle-shaped container by sufficient biaxial orientation blow-molding and a bottom $P_3$ outwardly protruded in semi-spherical shape.

A gate for injection-molding the piece P is generally at the outer bottom end of the bottom $P_3$, but is not particularly limited.

The piece P is generally formed on the inner peripheral surface thereof in rectilinear smooth plane but is ordinarily formed with drawing taper on the inner peripheral surface so as to readily draw a core from the mold for blow-molding the piece P.

Figure 11:
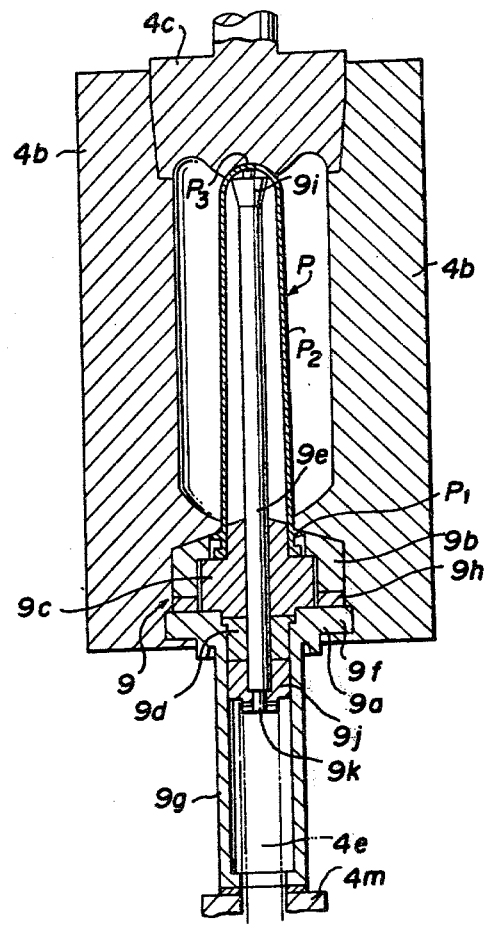
Figure 13:
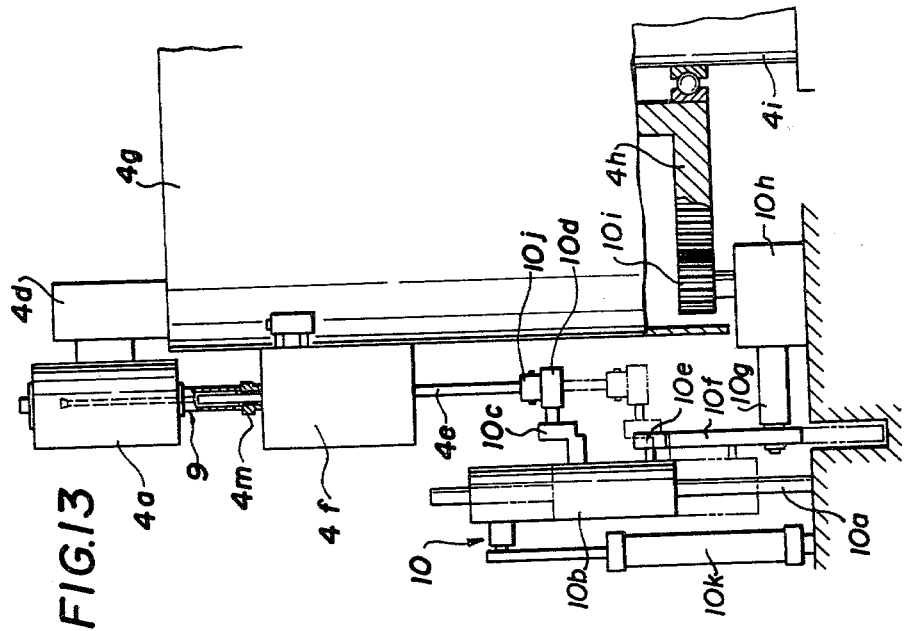
Figure 12:
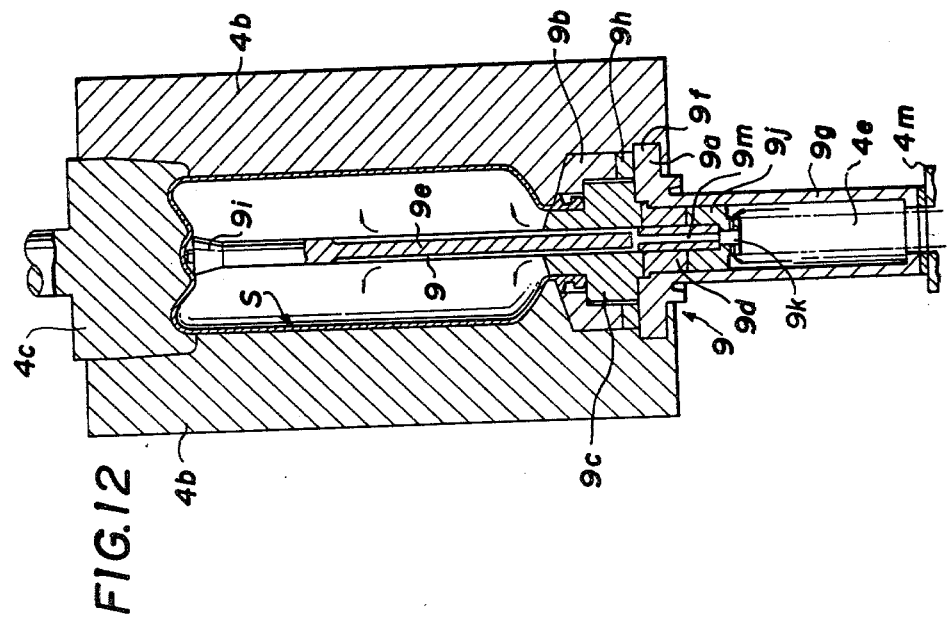

*JIG 9 (FIGS. 10 through 12)

As shown in FIGS. 10 through 12, the jig 9 consists essentially of a mandrel 9a, a neck support 9b, a core guide 9c, a spacer ring 9d and an orientation core shaft 9e.

The mandrel 9a consists of a collar-like or flange-like disk portion 9f and a cylindrical portion 9g of cylindrical shape suspended from the bottom center of the disk portion 9f, which portion 9g incorporates an internal space formed therein communicating with the central portion of the disk portion 9f.

Since the cylindrical portion 9g of the mandrel 9a incorporates a portion to be magnetically attracted to be held to the jig holder 2 assembled with the heating unit 1, the holding piece 5e of the piece loading and unloading unit 5, or the holding arms 6b of the loader 6, unloader 7 and transfer means 8 by means of magnetic attraction, it is fabricated of material having high magnetic permeability such as steel or the like.

The neck support 9b fixedly placed on the disk portion 9f of the mandrel 9a supports the outer periphery of the neck portion $P_1$ of the piece P and is assembled via a heat insulation plate 9h on the mandrel 9a.

More particularly, the neck support 9b of the jig 9 is formed with a hole, to which the neck portion $P_1$ of the piece P is inserted at the center, opened upwardly.

The core guide 9c is so assembled within the cylindrical neck support 9b as not to be detachable but as to elevationally smoothly slide the orientation core shaft 9e disposed on the central axis of the jig 9 and to also retain the position of the core shaft 9e, and is made of synthetic resin such as Teflon.

The upper half portion of the core guide 9c facing with the hole for inserting the neck portion $P_1$ of the piece P in the neck support 9b is formed in cylindrical shape for substantially snugly inserting into the neck portion $P_1$ of the piece P so as to hold the piece P between the core guide 9c and the neck support 9b without unsteadily rocking.

It is preferred to provide a spacer ring 9d within the mandrel 9a under the core guide 9c as required to operate as a center guide.

The orientation core shaft 9e elevationally movably disposed along the central axis of the jig 9 is lifted by the lifting operation of the orientation pin 4e of the blow-molding machine 4 to axially orient the piece P assembled with the jig 9 when inserted into the blowing mold 4a of the blow-molding machine 4, and attaches a core top 9i of heat insulating material such as Teflon of inverted frusto-conical shape having an inverted tapered peripheral surface of the top thereof making contact with the bottom $P_3$ of the piece P at axially orienting time. This prevents thermal conduction therebetween and adhesive sticking of the piece P and a nozzle $9j$ of piston shape to the bottom disposed within the cylindrical portion $9g$.

The core shaft $9e$ and the nozzle holder $9j$ are formed with air passages, respectively therethrough for blowing compressed air from a compressed air supply controller $4f$ of the blow-molding machine into the piece P.

T-shaped hole or passage $9k$ is radially outwardly perforated at the projection of the nozzle holer $9j$ for making contact with the orientation pin $4e$ to communicate with an air passage $9m$ formed elevationally within the core shaft $9e$, which passage $9m$ is opened with splined groove-like openings $9l$ perforated substantially over the entire length of the core shaft $9e$.

The splined groove-like openings $9l$ thus opened with the passage $9m$ to communicate with the interior of the piece P held by the jig 9 are advantageously perforated or formed to eliminate an insufficient mechanical strength of the long orientation core shaft $9e$ to be caused by the air passage $9m$ if the core shaft $9e$ is perforated entirely in hollow structure. This is important since the compressed air blowing pressure for radially orienting the piece P becomes at a maximum 50 kg/cm$^2$ a considerably high pressure. This also eliminates partial blowing of the compressed air in blow-molding operation so as to thereby overcome an apprehension of forming recesses on the wall surface of the piece P due to compressed air jet.

*HEATING UNIT 1 (FIGS. 1 through 5)

The heating unit 1 is constructed to uniformly heat the entire pieces P supplied in cooled state from the injection molding machine to the temperature capable of biaxially orientation blow molding. The heating unit 1 equi-distantly supports a number of jig holders 2 for holding a number of jigs 9 at the peripheral end of the turntable $1n$ formed with a rack 10 at the peripheral end thereof by means of magnetic attraction.

A cover $1b$ is provided to cover almost all the rotary movement line integral with the turntable $1n$ of the jig holders 2 so as to shut it off from the exterior and thus form a heating chamber $1a$.

The heating chamber $1a$ is internally divided into a plurality of heating zones $1c$ separately controlled along the moving path of the jig holders 2 so as to stepwisely heat the pieces P.

A plurality of lateral heating rods $1e$ (two in the embodiment shown) are disposed at one side (inside in the embodiment shown in FIG. 5) along the moving path of the jig holders 2 at every heating zone $1c$ in the heating chamber $1a$, and a number of heating rods $1d$ are longitudinally disposed at the other side therein.

Waste heat damper units $1f$ are provided on the upper surface of the cover $1b$ of the respective heating zones $1c$, and consist of a set of two waste heat cylinders $1g$ for externally opening the interior of the heating zones $1c$, and dampers $1h$ supported at a shaft $1i$ for controlling the opening or closing operation of the cylinders $1g$ with the shaft $1i$ connected to a drive unit $1j$.

The temperatures in the respective heating zones $1c$ of the heating chamber $1a$ are detected by thermostats $1k$ separately provided within the zones $1c$, which send a detection signal to a controller $1l$, which thereupon generates a command for driving the drive unit $1j$ so as to control the opening or closing operation of the respective dampers $1h$ to thereby control the temperature within the heating zones $1c$ at set value.

The respective heating zones $1c$ are so arranged along the moving path of the jig holders 2 as to be in the order of the heating zones $1c_1$, $1c_2$, $1c_3$, $1c_4$, which are, for example, heated at the set temperatures within the heating zones as below.

| | |
|---|---|
| Heating Zone $1c_1$: | 140 to 160° C. |
| Heating Zone $1c_2$: | 160 to 180° C. |
| Heating Zone $1c_3$: | 180 to 220° C. |
| Heating Zone $1c_4$: | 160 to 200° C. |

The heating rods $1d$, $1e$ are so disposed as to be divided into lateral and elevational attitudes, respectively so that, when the pieces P are moving while rotating within the heating chamber $1a$, only the heating rods $1e$ of lateral attitude are rotated, namely, when the jig holders 2 are rotated around the center of the heating unit 1 integrally with the turntable $1n$, the rotary portions of the jig holders 2 are accordingly rotated according to the turning operation of the turntable $1n$ upon engagement of the pinion gear $2j$ with the rack $1q$ of the stationary table $1p$ to thereby rotate the jigs 9 held by the jig holders 2.

The turning operation of the turntable $1n$ is carried out by transmitting the rotary force of the motor 13 through a reduction gear 14 to an exclusive reduction gear $1u$, through a drive gear $1s$ secured to the output shaft $1t$ of the reduction gear $1u$ to a rack 10 formed on the peripheral end of the turntable $1n$ via an engagement therebetween.

The jig holder 2 magnetically attracts, as described above, the jig 9 at its cylindrical portion $9g$ for holding the piece P to rotate around the heating unit 1 while turning around its own axis along with the rotation of the turntable $1n$ and to be secured to the peripheral end of the turntable $1n$ at a frame $2a$ of hollow cylindrical shape.

The mounting frame $2a$ is opened at the top, and is also opened via a rack hole $2b$ at the lower end.

There are provided a cylinder $2d$ via bearings $2c$, and a vertical shaft $2h$ elevationally movably but not rotatably assembled within the cylinder $2d$ within the frame $2a$.

The cylinder $2d$ is so inserted into substantially the entire length of the frame $2a$ as to be rotatably assembled via the bearings $2c$ at the upper and lower ends with frame $2a$ with a guide hole $2n$ of vertical length perforated at the cylindrical wall portion disposed between the upper and the lower bearings $2c$.

A supporting holder $2e$ is integrally stood from the upper end of the cylinder $2d$ projected from the upper end of the frame $2a$ so as to be partly extended upwardly from the cylindrical wall of the cylinder $2d$ in such a manner that the inner surface thereof is internally curved. The curvature is substantially equal to the outer peripheral surface of the cylindrical portion $9g$ of the jig 9.

A permanent magnet piece $2f$ is implanted into the upper portion of the supporting holder $2e$ for magnetically attracting the jig 9 at the cylindrical portion $9g$. Since the support holder $2e$ has higher height than the cylinder portion $9g$ of the jig 9, the jig 9 attracted to the support holder $2e$ is so positioned at the bottom end surface of the cylindrical portion $9g$ as to be separate from the upper end surface of the cylinder $2d$.

The jig holder 2 elevationally movably mounts an elevational shaft 2h within an axial hole 2g formed within the cylinder 2d, namely, in the internal space in the cylinder 2d, which shaft 2h is extended downwardly at the bottom end thereof from the axial hole 2g through the race 2b under the mounting frame 2a.

The jig holder 2 also incorporates a movable pin 2i movably engaged within the guide hole 2n of the elevational shaft 2h at the position facing with the guide hole 2n to be secured in radially projected manner, which pin 2i is so movably engaged within the guide hole 2n that the shaft 2h may be elevationally movable with respect to the cylinder 2d but be impossible to rotarily displace.

The jig holder 2 also incorporates a roller 2k mounted at the bottom end of the elevational shaft 2h downwardly projected under the frame 2a in such a manner that, when the shaft 2h is moved to the lower limit immediately above the roller 2k, a pinion gear 2j is integrally formed to engage and mesh with the rack hole 2b at the position out of the frame 2a.

The jig holder 2 also incorporates a compression spring 2m so assembled between the cylinder 2d and a movable pin 2i protruded through the hole 2n within the frame 2a that the cylinder 2d is engaged therewith to always urge elastically the shaft 2h to be disposed at the lowermost position with respect to the cylinder 2d.

POSITION CONTROLLER 3 (FIGS. 2, 4, 8 and 9)

The position controller 3 is constructed to control the rotary position of the cylinder 2d and vertical shaft 2h combination so that the inside surface of the supporting holder 2e accurately is directed externally of the turntable 1n when loading the jig 9 to the jig holder 2 and unloading it from the jig holder 2, and consists of two intermittently revolving gears 3b, a chain 3c for transmitting the rotary force to the gears 3b, a cam unit 3g for rotating the gear 3b, and a cam plate 3h as essential components.

The gear 3b is rotatably assembled within the turntable 1n in the recess 3a perforated at the turntable 1n of circular flat shape partly opened with the peripheral end of a stationary table 1p on the back surface of the table 1p which is secured oppositely to the position behind the position for unloading the jig 9 from the jig holder 2 along the moving path of the holder 2 and before the position for loading the jig 9 to the jig holder 2. The teeth formed at the peripheral end are partly elevationally coincident to the rack 1q of the table 1p.

More particularly, the gear 3b is so set at the position with respect to the rack 1q that the pinion 2j engaged with the rack 1q of the stationary table 1p brings into mesh with the teeth of the gear 3b according to the motion of the table 1n or vice versa.

The rack 1q is not formed at the peripheral end portion of the stationary table 1p between the gears 3b corresponding to the gear 3b.

That is, the rack 1q of the stationary table 1p is so formed to the position that the pinion 2j is transferred from the table 1p to the gear 3b or vice versa in engagement according to the turning operation of the turntable 1n.

A drive gear 3d is coaxially integrally secured to both the gears 3b with a chain 3c engaged with the drive gear 3e secured to the output shaft 3f of the cam unit 3g operated via the reduction gear 14.

The cam plate 3h is disposed directly under the moving path of the jig holder 2 between the gears 3b to raise the vertical shaft 2h against the tension of the spring 21 so as to allow the pinion 2j in engagement to transfer from the gear 3b to the rack hole 2b in order to stationarily hold the position of the supporting holder 2e with respect to the turntable 1n when the supporting holder 2e is transferred from the rack 1q of the stationary table 1p to the gear 3b to then hold the predetermined position.

In this case, the elevational shaft 2h thus lifted impacts the bottom end of the jig 9 held magnetically by the support holder 2e to slightly move the jig 9 upwardly. This slight upward movement of the jig 9 can be safely and exactly achieved by the operation so that the piece P held by the jig 9 is loaded from the heating unit 1 to the loader 6 in such a manner that the disk portion 9f of the jig 9 may not impact the holding arm 6b of the loader 6.

Figure 9:
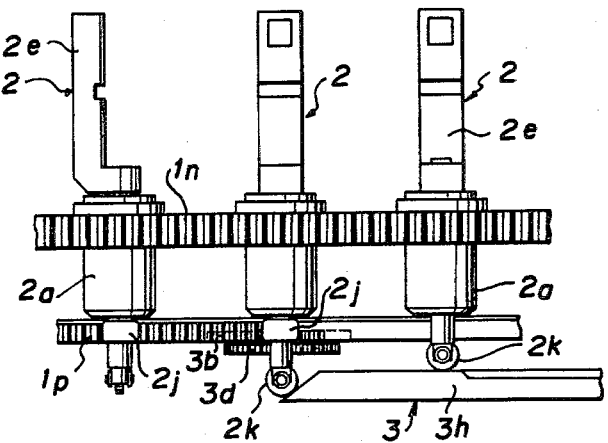
Figure 8:
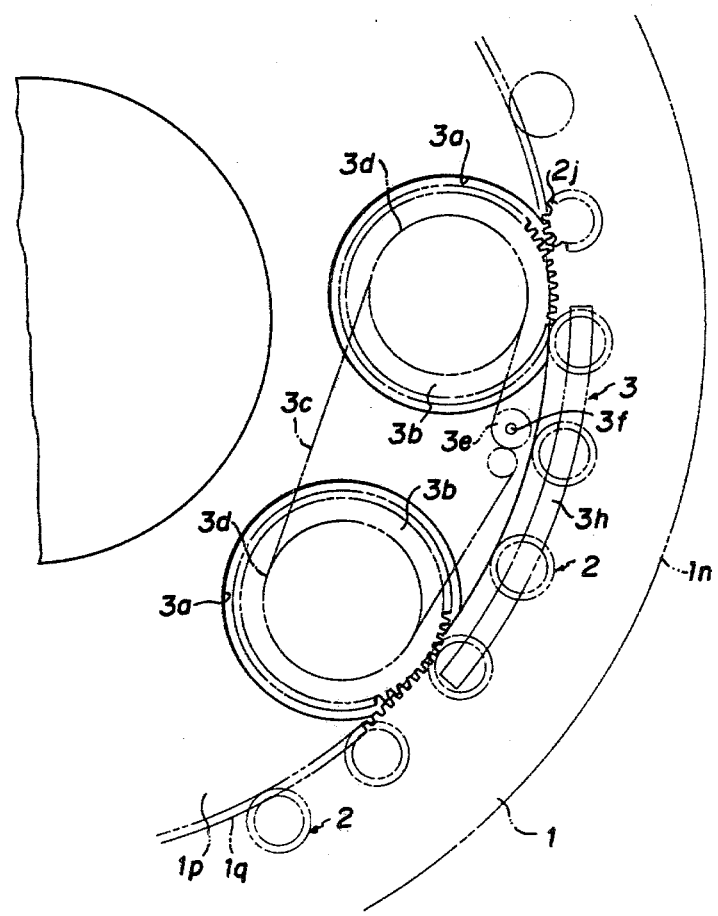

As clearly understood from FIG. 9, the roller 2k at the lower end of the vertical shaft 2h rides on the oblique surface of the cam plate 3h to be urged onto the surface as it is until the pinion 2j is brought into mesh with the rack hole 2b when the pinion 2j is transferred from the rack 1q of the stationary table 1p onto the gear 3b to cause the supporting holder 2e to become in predetermined position so as to start rotating integrally with the turntable 1n. When approaching the position for receiving the jig 9, the vertical shaft 2h is lowered by the tension of the spring 21 along the oblique surface of the cam plate 3h to cause the pinion 2j to be brought into mesh with the gear 3b.

Therefore, the supporting holder 2e is continuously held in predetermined position set at least within the range of the position of the cam plate 3h.

The cam unit 3g receives a continuously rotating input from the reduction gear 14 and outputs an intermittently rotating power to the output shaft 3f so as to intermittently rotate the intermittently rotatable gear 3b by the input at predetermined timing in an angular amount of predetermined central angle.

The intermittently rotating or revolving operation of the gear 3b together with its timing will now be described in detail.

The gear 3b disposed at the unloading side of the jig 9 starts rotating in the same direction as the support holder 2e immediately before the support holder 2e rotating around its own axis attains the predetermined position so that it is directed at the inside surface thereof outwardly after the pinion 2j completely transfers from the rack 1q of the stationary table 1p to the gear 3b side, reaches an equal peripheral speed to the moving speed of the jig holder 2 when the support holder 2e rotating around its own axis attains that predetermined position to then continue its rotation at the peripheral speed for predetermined time.

Since the gear 3b rotates at equal speed to the moving speed of the jig holder 2 at the peripheral speed as was described previously, the elevational or vertical shaft 2h and cylinder 2d combination engaged with the pinion 2j with the gear 3b attains the state stopped with respect to the turntable 1n to thereby effect that the support holder 2e is held in predetermined position with respect to the turntable 1n.

When the gear 3b thus performs, upon rotation thereof, to allow the support holder 2e to be held in predetermined attitude, the elevational shaft 2h is immediately lifted by the cam 3h to transfer the pinion 2j in engagement from the gear 3b to the rack hole 2b so as to mount to hold the shaft 2h and cylinder 2d combination in a manner impossible to rotate with respect to the turntable 1n while holding the attitude of the support holder 2e as predetermined.

The gear 3b will stop its rotation shortly after the pinion 2j is transferred in engagement from the gear 3b to the rack hole 2b.

On the other hand, the gear 3b thus disposed at the loading side of the jig 9 starts its rotation in the same direction as the jig holder 2 from about the time when the roller 2k starts lowering on the oblique surface of the cam plate 3h, and becomes at equal peripheral speed to the moving speed of the jig holder 2 when engaging in mesh with the pinion 2j which is projected from the rack hole 2b upon downward movement of the elevational shaft 2h.

The gear 3b slightly rotates while engaging in mesh with the pinion 2j, stops its rotation at the position where the rack 1q becomes coincident elevationally to the teeth of the gear 3b immediately before the pinion 2j makes engagement with the rack 1q of the stationary table 1p, and transfers the engagement with the pinion 2j from the gear 3b to the rack 1q of the stationary table 1p.

In the drawings as exemplified in the preferred embodiments of the present invention, the rotating timing and angular amount of the gears 3b, 3b are entirely the same with each other.

In order to rotate the support holder 2e to be disposed at a predetermined position where the support holder 2e directs its inner surface outwardly at preferred timing immediately after the pinion 2j is engaged rom the rack 1q of the stationary table 1p to the gear 3b, a predetermined relationship is set among the number of teeth of the rack 1q of the stationary table 1p, the number of teeth of the pinion 2j, and the position of the gear 3b.

It is also noted that the jig 9 is unloaded from the heating unit 1 after the elevational shaft 2h is competely lifted by the cam plate 3h and that the jig 9 is loaded to the heating unit 1 in the vicinity before the pinion 2j is engaged in mesh with the gear 3b.

*BLOW MOLDING MACHINE (FIGS. 1, 11 to 13)

The biaxially orientation below molding machine 4 is constructed to load the piece P uniformly heated as assembled with the jig 9 to the blowing mold 4a, to biaxially orient the piece P by means of the orientation cam unit 10 as will be hereinafter described in greater detail, to blow compressed air into the piece P by the operation of a compressed air supply controller 4f to radially orient the piece P for a container product S. The machine to then cool and solidify the product S, and consists of a turntable 4g, twelve blowing molds 4a equi-distantly attached to the peripheral end of the turntable 4g, a shaft 4i as the rotatable shaft of the turntable 4g, a rack table 4h integral with the turntable 4g, and a reduction gear 4l as essential components.

Each of the twelve blowing molds 4a equi-distantly installed at the peripheral end of the turntable 4g as exemplified in the preferred embodiment consists of split dies 4b horizontally openable, like the pages of a book around an openable shaft 4d as an axis as the portion for assembling the molds 4a with the turntable 4g, and bottom die 4c for forming the bottom of the product S.

There is provided a compressed air supply controller 4f for blowing the compressed air into the piece P through the jig 9 assembled with the mold 4a at the position directly under the mold 4a, which controller 4f raises a nozzle tip 4m to the lower end of the cylindrical portion 9g of the jig 9 assembled with the mold 4a to airtightly attach it under pressure thereto to enable blowing of the compressed air from the lower end opening of the cylindrical portion 9g into the cylindrical portion 9g immediately after completing the closure of the blowing mold 4a.

The controller 4f consists of an orientation pin 4e elevationally movably coaxially assembled with the nozzle tip 4m through itself, and an orientation core shaft 9e provided directly under the jig 9 assembled with the mold 4a in such a manner that the pin 42 may enter at the upper end from the lower end opening of the cylindrical portion 9g of the jig 9 assembled with the mold 4a into the cylindrical portion 9g to thereby push up the core shaft 93.

The turntable 4g is rotatably assembled via the bearings with the shaft 4i fixedly stood on the floor integrally with the rack table 4h at the lower end of a cylinder.

Rack is formed at the peripheral end of the rack table 4h staying in mesh with the rack table 4h at the drive gear 4j secured to the output shaft 4k of the reduction gear 4l for transmitting the rotary force from the motor 13.

The blowing mold 4a in the blow molding machine 4 opens both split molds 4b by a cam mechanism (not shown) immediately before the position for unloading the jig 9, simultaneously lifts the bottom mold 4c, maintains the opened split molds 4b until the jig 9 reaches the loading position, and closes the split molds 4b about simultaneously when the jig 9 is loaded.

After the split molds 4b are thus closed tightly, the mold 4a is urged onto the bottom end of the cylindrical portion 9g of the jig 9 assembled with a nozzle tip 4m therewith. An orientation cam unit is then operated to lift the orientation pin 4e to thereby lift the orientation core shaft 9e upwardly so as to thereby axially orient the piece P.

The compressed air supply controller 4f is operated after completing the axial orientation of the piece P or simultaneously upon the orientation of the piece P to blow the compressed air into the piece P so as to radially orient the piece P to thus complete the biaxial orientation blow molding of the piece P into a final product s such as a bottleshaped container.

When the product S is thus completed, it is sufficiently cooled and thereby solidified, and is discharged with the compressed air thus blown thereinto at suitable timing until the jig 9 reaches the position for unloading it.

Figure 17:
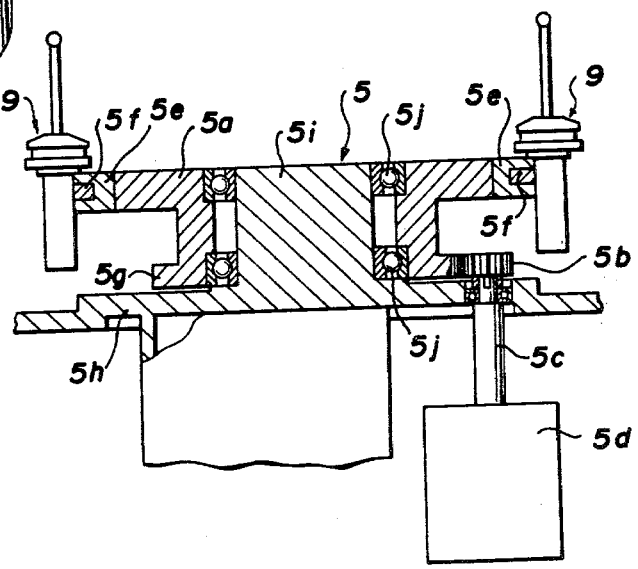
FIG. 17 is a longitudinal sectional view of the fundamental configuration of the piece loading and unloading unit.

*LOADING AND UNLOADING UNIT 5 (FIGS. 1, 3 and 17)

The loading and unloading unit 5 is constructed to load the piece P in neck downward position to the jig 9 and to unload the container product S thus molded from the blow molding apparatus out of the apparatus, and consists of a turntable 5a, holding pieces 5e, and a reduction gear 5d as essential components.

The turntable 5a is rotatably assembled through bearings 5j with the shaft 5i as a rotating axis and the base plate 5h as a base.

Twelve holding pieces 5e are disposed with permanent magnet piece 5f retained on the holding surface thereof for holding the jig 9 in a recessed surface having curvature equal to the outer diameter of the cylindrical portion 9g of the jig 9 and are equi-distantly secured to the peripheral edge of the turntable 5a.

A rack disk 5g is integrally secured to the turntable 5a via the cylinder with rack formed thereat, and is brought into mesh with a drive gear 5b secured to the output shaft 5c of a reduction gear 5d.

The loading and unloading unit 5 loads the piece P to the jig 9, namely to supply the piece P to the apparatus of this invention, and unloads the container product S from the jig 9, namely to unload the product S from the apparatus of this invention by using suitable means (not described any further).

*LOADER 6 (FIGS. 1, 4, 18 and 19)

The loader 6 is constructed to transfer the jig 9 assembled with the piece P heated to uniform temperature and supported by the jig 9 by the heating unit 1 from the heating unit 1 to the blow molding machine 4 by the rotary motion, and consists of a rotor 6a, and a cam unit 6f as essential components.

The rotor 6a is secured to the upper end of the output shaft 6e of the cam unit 6f with a desired number of holding arms 6b (three in the embodiment shown) for holding the jigs 9.

There is formed an end recess portion 6c of recessed surface with the same curvature as that of the outer peripheral surface of the cylindrical portion 9g of the jig 9 at each end of the holding arms 6b with permanent magnet piece 6d implanted into the bottom surface thereof.

The cam unit 6f is constructed to convert the constantly rotating input from the reduction gear 14 to continuously rotate the rotor 6a according to the predetermined speed variation curves at the speed substantially equal to the peripheral speed of the turntable 1n or the moving speed of the jig holder 2 at the end of the holding arms 6b when the holding arms 6b are located at the position for loading the jig 9 to the arm 6b from the heating unit 1 and also to the peripheral speed of the turntable 4g or the moving speed of the mold 4a at the end of the holding arms 6b when the holding arms 6b are located at the position for unloading the jig 9 to the blow molding machine 4.

*UNLOADER 7 (FIGS. 1, 4 and 20.)

The unloader 7 is constructed to transfer the jig 9 supporting the container product S biaxially orientation blow-molded by the blow molding machine 4 from the blow molding machine 4 to the loading and unloading unit 5, and is fundamentally entirely the same as that of the loader 6 except for that the length of the holding arms 7b is alightly longer than that of the loader 6.

That is, the unloader 7 consists of a rotor 7a for equidistantly attaching the desired number of holding arms 7b at the top of the output shaft 7e of the cam unit 7f, and permanent magnet piece 7d implanted onto the bottom surface of the recess portion 7c of the holding arm 7b.

The cam unit 7f is constructed to convert the constantly rotating input from the reduction gear 14 to continuously rotate the rotor 7a according to the predetermined speed variation curves at the speed substantially equal to the blowing mold 4a when the end of the holding arm 7b is located at the position for loading the jig 9 from the blow molding machine 4 and to the holding arm 5e when the end of the holding arm 7b is located at the position for unloading the jig 9 to the loading and unloading unit 5.

*TRANSFER MEANS 8 (FIGS. 1, 4, 21 and 22)

The transfer means 8 is constructed to transfer the piece P supported at the jig 9 in neck downward position from the loading and unloading unit 5 to the heating unit 1 by means of the rotary motion, and consists of a rotor 8e, holding arms 8b, end recessed portion 8c, permanent magnet piece 8d, output shaft 8e, and a cam unit 8f of the same purpose as those of the loader 6 and unloader 7.

The cam unit 8f is constructed to rotate the rotor 8e according to the specific speed variation curves equal to those of the other cam units 6f, 7f.

That is, the cam unit 8f of this transfer means 8 is constructed to convert the constantly rotating input from the reduction gear 14 to continuously rotate the rotor 8a according to the speed variation curves at the speed substantially equal to the holding piece 5e when the end of the holding arm 8b is located at the position for loading the jig 9 from the loading and unloading unit thereto and also to the jig holder 2 when the end of the holding arm 8b is located at the position for unloading the jig 9 therefrom to the heating unit 1.

In the preferred embodiment exemplified in the drawings, the rotor 8a of the unloader 8 incorporates in construction four holding arms 8b equi-distantly of central angle disposed, thus arranged since the turning speeds of the turntables 1n and 5a are slower than that of the turntable 4g as was described.

*OPERATION OF TRANSFER OF JIG 9 (FIGS. 23 to 28)

Figure 23:
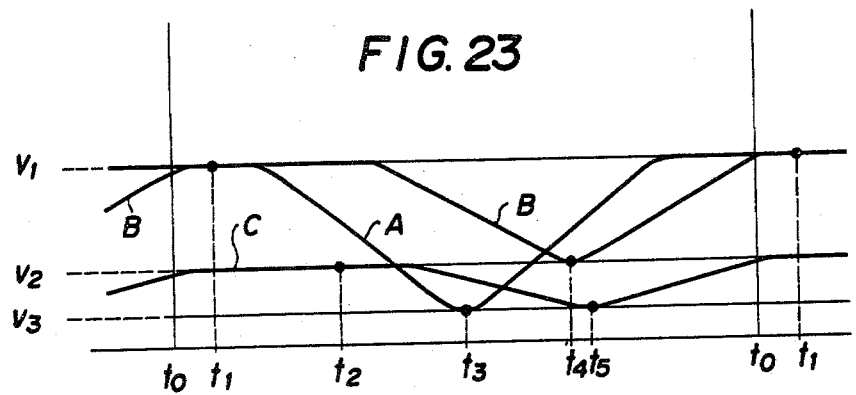

FIG. 23 shows one example of the rotating speed variation curves of the respective rotors 6a, 7a and 8a.

In FIG. 23, the curve A indicates the speed variation curve of the rotor 6a, and the curve B that of the rotor 7a, and the curve C that of the rotor 8a.

The speed variation curves in FIG. 23 are not drawn in case that the rotors 6a, 7a and 8a are rotated in the same amount within the same period as standard, but are drawn along the time flow commonly with the operation of one loading and unloading of the jig 9 at respective rotors 6a, 7a and 8a.

In the embodiment shown, the rotors 6a, 7a with three holding arms 6b, 7b, respectively, therefore, rotate 120° of central angle from the time $t_O$ to next time $t_O$, however, the rotor 8a with four holding arms 8b rotates 90° of central angle from the time $t_O$ to the next time $t_O$.

The mutual timing relation upon transfer of the jig 9 of the rotors 6a, 7a and 8a can be set suitably at the standard, and in the embodiment shown, it is so set that the jig 9 is transferred from the loader 6 to the blow molding machine 4 at the time $t_1$, and the jig 9 is transferred by the unloader 7 from the blow molding machine 4 at the same time $t_1$.

The standard value of the rotating speeds of the rotors 6a, 7a and 8a can be suitably set, and in the embodiment shown, they are so set that the speed V1 equals the moving speed of the blowing mold 4a as the standard at the end of the holding arm 6b in case of the rotor 6a, the speed $V_1$ similarly in case of the rotor 7a to the rotor 6a, and the speed $V_2$ equal to the moving speed of the holding piece 5e at the end of the holding arm 8b in case of the rotor 8a.

More particularly, the rotor 6a is normally rotated at the peripheral speed $V_1$ substantially equal to the peripheral speed of the turntable 4g, however, when the end of the holding arm 6b approaches the position for receiving the jig 9 from the heating unit 1, its speed is decelerated to the peripheral speed $V_3$ substantially equal to the moving speed of the jig holder 2, and when it passes through the position for receiving the jig 9, it returns to its original speed $V_1$. The rotor 7a is normally rotated at the same speed $V_1$ as that of the rotor 6a, however, when the end of the holding arm 7b approaches the position for transferring the jig 9 to the loading and unloading unit 5, it is decelerated to the speed $V_2$ substantially equal to the moving speed of the holding piece 5e, and when it passes through the position for transferring the jig 9, it returns to its original speed $V_1$. Then, the rotor 8a is normally rotated at the speed $V_2$, however, when the end of the holding arm 8b approaches the position for transferring the jig 9 to the heating unit 1, its speed is decelerated to the speed $V_3$, and when it passes through the position for transferring the jig to the heating unit 1, it returns to the original speed $V_2$. These operations are repeated in rotating speed variations.

Figure 24:
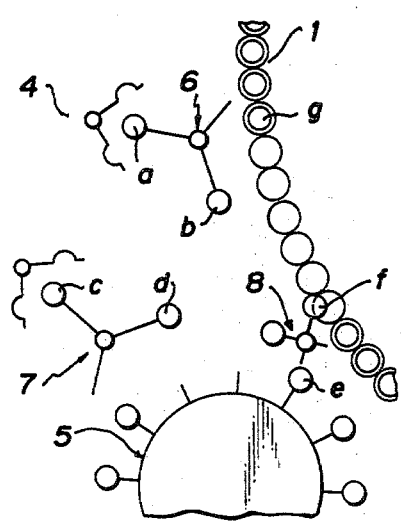

Referring now to FIG. 24, the jig 9 assembled with the piece P heated to uniform temperature is fed to the position for transferring to the blow molding machine 4 by the loader 6 at the time $t_1$, where the jig a is transferred to the blowing mold 4a, and the jig c assembled with the container product S biaxially orientation blow molded reaches the position for transferring it from the blow molding machine 4 to the unloader 7 to thus transfer the jig c to the unloader 7.

The next jig b transferred from the heating unit 1 to the loader 6 is moving toward the blow molding machine 4 at the time $t_1$, where the residual holding arms 6b of the loader 6 is moving toward the position for receiving the jig 9 from the heating unit 1.

Similarly, the jig d transferred by the unloader 7 already from the blow molding machine 4 is moving toward the loading and unloading unit 5.

Then, the jig e held by the loading and unloading unit 5 is located immediately before the position for transferring to the transfer means 8, while the jig f held by the transfer means 8 is moving toward the position for transfer to the heating unit 1.

Figure 25:
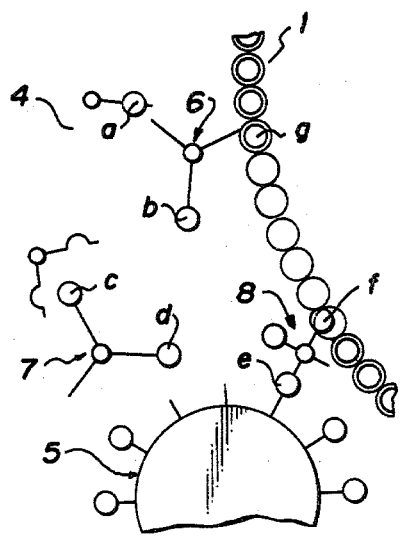

When it is elapsed from the time $t_1$ to the time $t_2$, referring to FIG. 25, the jig e held by the loading and unloading unit 5 reaches the position for transferring to be transferred to the transfer means 8.

Accordingly, at the time $t_2$, the loader 6 holds only one jig b of three holding arms 6b, while the unloader 7 holds two jigs c and d by the holding arms 7b, and the transfer means 8 holds three by the three holding arms 8b.

Figure 26:
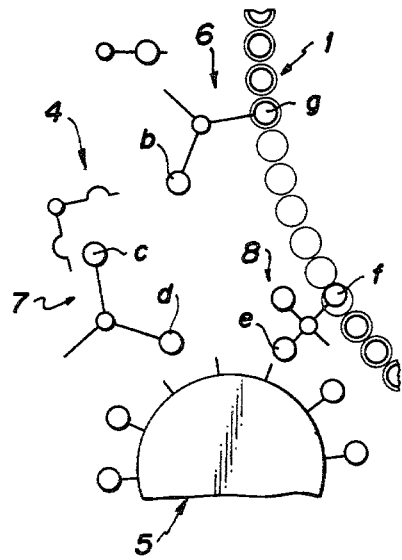

When it is passed from the time $t_2$ to the time $t_3$, referring to FIG. 26, the holding arm 6b of the loader 6 reaches the position for receiving the jig g from the heating unit 1 to thus receive the jig g.

Figure 27:
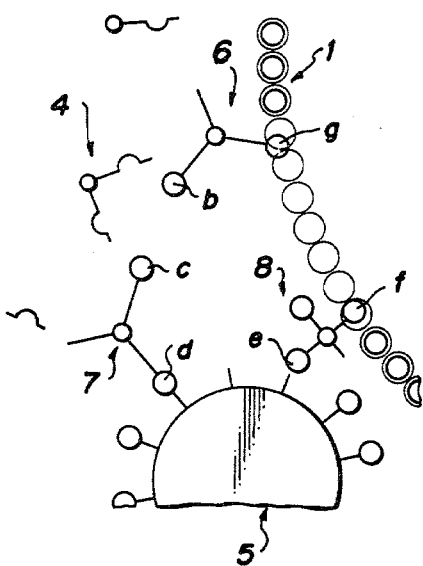

When it is elapsed from the time $t_3$ to the time $t_4$, referring to FIG. 27, the jig d held by the unloader 7 reaches the position for transferring to the loading and unloading unit 5 to transfer the jig d to the loading and unloading unit 5.

Figure 28:
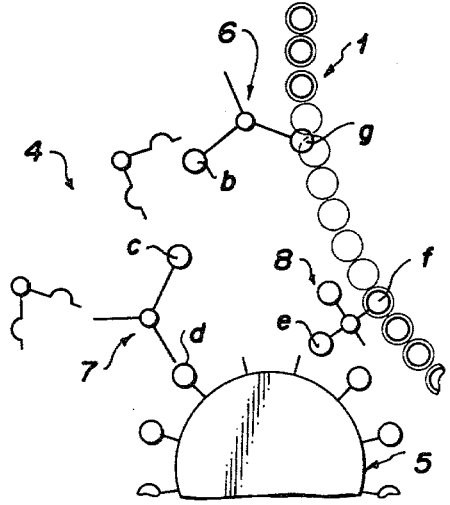

When it is slightly passed from the time $t_4$ to the time $t_5$, now referring to FIG. 28, the jig f held by the transfer means 8 reaches the position for transfer to the heating unit 1 to transfer it to the heating unit 1.

Thus, the loader 6, unloader 7, and transfer means 8 receive one jig 9 within predetermined time from the time $t_0$ to the time $t_0$ and simultaneously feed out always one jig 9.

This operation is entirely the same as the loading and unloading unit 5 and the heating unit 1, blow molding machine 4.

It should be understood that since one jig 9 is always fed out, if one jig 9 is received by the respective units 1, 4, 5, 6, 7 and 8 within predetermined time, the units 1, 4, 5, 6, 7 and 8 can continuously operate during the above predetermined time as one cycle.

It is noted that the moving speeds at the ends of the holding arms 6b, 7b, 8b of the loader 6, unloader 7 and transfer means 8, respectively are ideally preferred to be equal to those of the jig holders 2, blowing mods 4a or holding pieces 5e of the heating unit 1, blow molding machine 4 and piece loading and unloading unit 5, respectively facting therewith at the loading and unloading times of the jigs 9 among the heating unit 1, blow molding machine 4 and the piece loading and unloading unit 5 by the loader 6, unloader 7 or transfer means 8, but the jig 9 may be actually loaded and unloaded preferably between the members facting with each other for loading and unloading it even at slightly different speeds therebetween.

This operation for loading and unloading the jig 9 between the members facing with each other can be advantageously performed by the provision that the jigs 9 are magnetically attracted to be held by the jig holder 2, holding piece 53 and respective holding arms 6b, 7b, 8b and that the guide plates 12 are disposed at the position for loading and unloading the jigs 9 to forcibly unload the jig 9 from the side for unloading the jig 9 so as to load the jig 9 to the side for loading the jig under the guidance of the guide plates 12.

It is therefore carried out without fail to transfer the jigs 9 by means of the magnetically attracting force of the side for loading the jig 9 to the side for loading the jig 9 even if both the members for loading and unloading the jig 9 are slightly displaced at the position for loading and unloading the jig 9 in case where the jig 9 forcibly separated from the side for unloading the jig 9 via the guide plate 12 which is located within the range of the magnetically attracting force of the side for loading the jig.

It is preferred in order to aid this operation to successfully transfer the jig between the adjacent members facing with each other that the ends of the holding pieces 5e and holding arms 6b, 7b, 8b are protruded slightly in pawl shape at the side ends thereof (but not the rotating side at the time of molding them) as the ends of the holding arms 6b as exemplified in the preferred embodiment shown in FIG. 19.

\*ORIENTATION CAM UNIT 10 (FIGS. 1, 2, 13 to 15)

The orientation cam unit 10 is constructed to forcibly orient axially the piece P supported by the blowing mold 4a together with the jig 9 and to forcibly orient the piece P along the axial direction by the mechanical strength by utilizing the cam construction to thereby set accurately the time required for orienting the piece P in the required amount along the axis and also to eliminate the complicated pneumatic setting, switching, and supply and shut-off controls.

The orientation cam unit 10 consists of a guide pole 10a, a passage plate 10d, a cam plate 10f, and an accelerator 10h as essential parts.

The guide pole 10a is disposed at the position in the vicinity of the position immediately after the completion of closing of the dies after the blowing mold 4a disposed along the moving path of the mold 4a receives the jig 9.

An elevator 10b is elevationally movably assembled with the guide pole 10a with a passage plate 10d secured through the bracket 10c to the elevator 10b.

As obvious from FIG. 15, the passage plate 10d is disposed over the length of predetermined rotating range directly under the moving path of the blowing mold 4a with the orientation pin 4e downwardly extended through the compressed air supply controller 4f facing from directly above with the flat upper surface at the lower end.

A cam follower 10e is attached, in addition, to the elevator 10b to slidably make contact from above with the peripheral surface of the cam plate 10f secured to the output shaft 10g of the accelerator 10h.

The accelerator 10h allows the input gear 10i secured to the input shaft thereof with the rack table 4h of the blow molding machine 4 so as to input the rotary force from the rack table 4h.

In the preferred embodiment exemplified in the drawings, since the cam plate 10f is so constructed as to achieve one orientation upon one rotation thereof, it rotates one revolution every time the rack table 4h rotates one-twelfth of its rotation.

Accordingly, the passage plate 10d has a length of shorter than approx. one-twelfth of the trace of the moving circle of the blowing mold 4a.

The piston rod of a return cylinder 10k secured onto the floor surface is coupled at the end thereof with the elevator 10b so as to be exactly lowered to return to the original position by the operation of the cylinder 10k after the elevator 10b is raised by the cam plate 10f.

There is formed a lowering passage 10l directly under the moving path subsequent to the orientation step zone as described previously in the blowing mold 4a so as to lower the orientation pin 4e thus lifted to return to the original position.

More particularly, there is provided a stationary passage plate 10m so secured onto the passage plate 10d disposed at the raised limit at the height of the same as the passage plate 10d to form the lowering passage 10l in combination of the stationary passage plate 10m and the guide plate 10n.

In the preferred embodiment exemplified in the drawings, since the orientation pin 4e must be slidably moved at the bottom end thereof with respect to the passage plate 10d for lifting the orientation pin 4e in contact with the bottom end of the pin 4e, a roller 10j is so attached to the bottom end of the pin 4e as to perform smooth, slidable movement of the pin 4e and smooth transfer of the pin from the passage plate 10d to the stationary passage plate 10m in such a manner that the roller 10j is operated like a cam follower to forcibly lower the pin 4e to return to the original position by passing the roller 10j as engaged with the lowering passage 10l formed between the stationary passage plate 10m and the guide plate 10n.

It is naturally to be provided that the roller 10j thus lowered along the lowering passage 10l is located in height on the upper surface of the passage plate 10d thus lowered.

Figure 16:
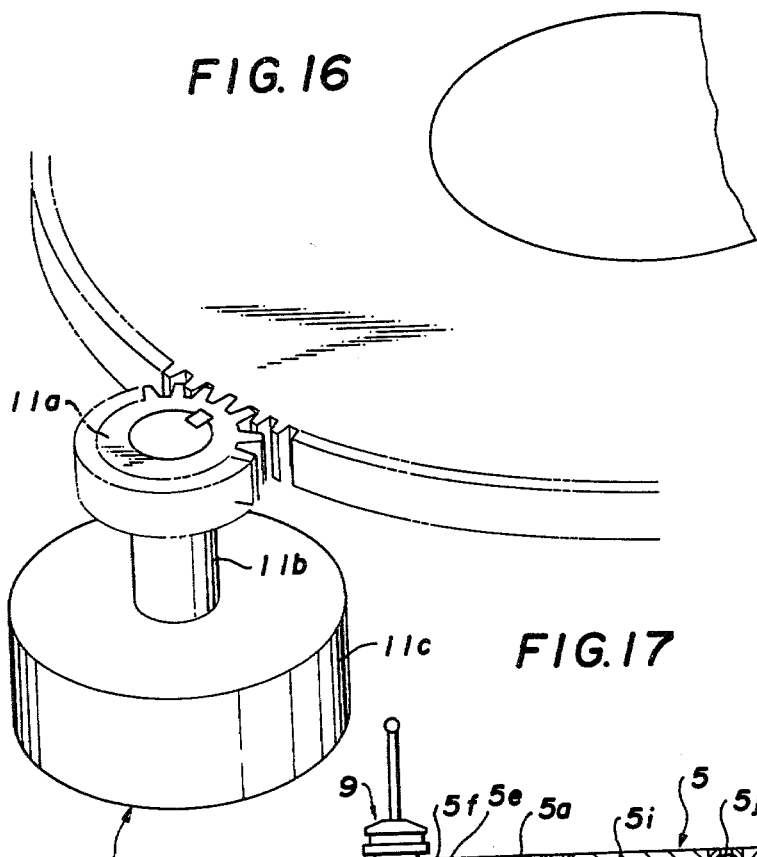
FIG. 16 is a perspective view in external appearance of the brake unit of the apparatus.

*BRAKE UNIT 11 (Refer to FIGS. 3 and 16)

The brake unit 11 is constructed to stop the entire machine of this invention when certain accidents occur during an emergency, and to shut off the power supply of the motor 13 when this brake unit 11 is operated.

This brake unit 11 is assembled with the blow molding machine 4 incorporating a number of large and heavy blow molds 4a, and consists of an electromagnetic brake 11c rigidly secured to the floor, a gear 11a secured to the input shaft 11b of the brake 11c and brought into mesh with the rack table 4h.

Since the blow molding machine 4 revolves the large and heavy blowing molds 4a attached in numerous number to the peripheral edge of the turntable 4g faster than the turntables 1n, 5a of the other units, it has the largest inertia.

Accordingly, it has large possibility of breaking the bearings, gears and reduction gear interiors due to the large inertial force of the turntable 4g even if the turntable 1n or 5a is, for example, braked to indirectly brake the turntable 4g and occurs an accident that the turntable 4g is delayed in stopping even if the other turntables 1n, 5a are stopped. In case when such an accident occurs, the rotating position timings among the jig holders 2, blowing molds 4a and holding pieces 5e set at the respective turntables 1n, 4g, 5a, respectively are malfunctioned to cause impossible smooth transfer of the jigs 9 among the units by the loader 6, unloader 7 and transfer means 8.

However, the heating blow molding machine of the present invention is advantageously constructed to mount the brake unit 11 at the blow molding machine 4 to directly brake the turntable 4g so as to stop it to thereby eliminate the affects of the large intertial force of the turntable 4g to the other turntables 1n, 5e to cause erroneously stopping position of the turntables 1n, 5a but to allow stoppage of the turntables 1n, 5a while maintaining its normal stopping position.

*OPERATION

The operation of the apparatus of this invention will now be described in the sequence according to the moving path of one jig 9.

When the jig 9 held by the loading and unloading unit 5 reaches the position for loading as designated by the mark "x", the piece P supplied from the injection molding machine by suitable holding means (not shown) is rigidly assembled with the jig 9 in neck downward position attitude.

The jig 9 thus assembled with the piece P is rotarily moved with the turntable 5a to be transferred by the transfer means 8 to the heating unit 1.

The jig 9 held by the jig holder 2 of the heating unit 1 is fed into the heating chamber 1a while rotating around its own axis as the turntable 1n is rotated, and is uniformly heated to predetermined temperature while passing through the respective heating zones 1c of the heating chamber 1a. Thus, the piece P is assembled from the heating unit 1 to the blowing mold 4a of the blow molding machine 4 by the loader 6 in the state that the rotation around its own axis is stopped by the position controller 3.

When a blowing mold 4a receives the jig 9 at the blow molding machine 4, its dies are tightly closed immediately. After the completion of the closure of the dies of the mold 4a, the compressed air supply controller 4f is immediately operated to urge the nozzle tip 4m onto the lower end of the cylindrical portion 9g of the jig 9 held by the mold 4a. The passage plate 10d of the orientation cam unit 10 simultaneously starts raising in parallel with the depression of the nozzle tip 4m to thereby push up the orientation pin 4e so as to forcibly orient the piece P axially and to feed the compressed air from the nozzle tip 4m through the cylindrical portion 9g and the hole 9k and the passage 9m into the piece P immediately after or simultaneously upon the orientation by the pin 4e by the operation of the compressed air supply controller 4f so as to radially orient the piece P for blow molding.

The passage plate 10d for pushing up the pin 4e is lowered to the original position after moving from the plate 10d to the passage plate 10m separately from the orientation blow molding of the piece P.

The orientation pin 4e for disposing the roller 10j onto the passage plate 10m enters the roller 10j into the lower passage 10l according to the rotating operation of the turntable 4g so as to forcibly lower to the original position.

The blowing mold 4a biaxially orientation blow molding the piece P by means of the orientation pin 4e and the compressed air to the container product S cools and solifies the product S while the jig 9 is transferred to the unloader 7, and discharges the compressed air thus charged into the piece into the atmosphere at suitable time.

The jig 9 supporting the molded product S is transferred from the blowing mold 4a to the unloader 7 at the position for transferring to the unloader 7, which transfers the product into the loading and unloading unit 5.

The jig 9 supporting the product S and transferred to the loading and unloading unit 5 unloads only the product S at the position for unloading the product S as designated by an arrow Y in FIG. 1 by means of suitable product pickup unit (not shown) provided integrally with the unit 5 or in the vicinity of the unit 5, and rotarily move together with the turntable 5a as it is to again return to the position for assembling the piece P for completing one circulating conveyance of the piece P.

A number of the jigs 9 repeatedly operate the above circulating conveyance of the pieces P at slightly displaced time.

It should be understood from the foregoing description that, since the heating blow molding machine of this invention continuously rotates the respective turntables 1n, 4g, and 5a and the rotors 6a, 7a, and 8a for circulatingly conveying the jigs 9 at individual intrinsic rotating speeds, it can shorten the time required to transfer the jigs 9 and repeat no stop and start to thereby eliminate the vibration during the conveyance of the jigs 9 and to accordingly irregularly separate no jigs 9 from the jig holders 2, holding pieces 5e, and holding arms 6b, 7b, 8b so as to thus perform the safe conveyance of the jigs 9 therethrough.

It should also be appreciated that since the heating blow molding machine of this invention rotatably drives the rotors 6a, 7a, 8a rotating according to respective instrinsic speed variation curves by the exclusive cam units 6f, 7f, 8f, respectively, which are commonly driven through one reduction gear 14 by a sole drive power, the rotors 6a, 7a, 8a are readily rotated at preferred synchronous timing to thereby simplify the constructions of the cam units 6f, 7f, 8f.

It should also be appreciated that, since the heating blow molding machine of this invention does not even instantaneously stop the jigs 9 but always continuously moves them along the circular curve for circulating conveyance of the jigs, it can mold as many as twice the pieces P per unit time as compared with the conventional apparatus of this type. In addition, since the conveyance itself of the jigs is very smooth without vibration, the machine of this invention does not necessitate various auxiliary means such as brake unit, buffer unit, and further timing position correcting unit or the like so as to simplify as such the entire construction of the machine of this invention.

It should also be understood that since the heating blow molding machine of this invention is so constructed as to employ the simple rotors 6a, 7a, 8a in the loader 6, unloader 7 and transfer means 8, respectively for transferring the jigs 9 among the turntables 1n, 4g and 5a and to rotate the rotros 6a, 7a, 8a via the exclusive cam units 6f, 7f, 8f, respectively according to the predetermined intrinsic speed curves, it can simplify the conventional complicated construction for transferring the jigs among the respective units and can also take preferred synchronous timing thereamong.

What is claimed is:

1. A heating blow-molding machine, comprising:
    heating means for heating a plurality of injection molded preformed pieces to a temperature for biaxial orientation blow-molding the pieces, comprising:
        a first turntable;
        a plurality of jig holders having axes equidistantly mounted at the peripheral edge of said first turntable for holding a plurality of jigs, said jig holders being passed through a heating chamber upon rotation of said first turntable and being rotatable about their axes;
        a plurality of guide plates located at positions for loading jigs to and unloading jigs from said first turntable, disposed along the rotating path of said first turntable at the jig loading position and disposed partly across the rotating path at the unloading position;
    a piece blow-molding means for biaxially orientation blow molding pieces heated by said heating means, comprising:
        a second turntable spaced from said first turntable;
        a plurality of hinged blowing molds mounted equidistantly on the peripheral edge of said second turntable, capable of closing upon said jigs;
        a plurality of guide plates located at positions for loading jigs to an unloading jigs from said second turntable, disposed along the rotating path of said second turntable at the jig loading position and disposed partly across the rotating path at the unloading position;
    piece loading and unloading means for sequentially continuously receiving pieces in a neck downward position into said jigs and unloading finished products from said jigs, comprising:
        a third turntable spaced from said first and second turntables;
        a plurality of jig holders equidistantly located at the peripheral edge of said third turntable;
        a plurality of guide plates located at positions for loading jigs to and unloading jigs from said third turntable, disposed along the rotating path of said third turntable at the jig loading position and disposed partly across the rotating path at the unloading position;
    first transfer means located between said first and second turntables, comprising;
        a first rotor having arms with jig holders at the ends of the arms for transferring jigs from said heating means to said piece blowing means;

a first cam unit driven by a continuous drive source for driving said first rotor to provide intrinsic rotation to said first rotor, converting constant rotating input from said drive source according to a predetermined speed variation curve, such that the rotational speed of said first rotor arms jigholders is substantially equal to the peripheral rotational speed of said first turntable when unloading jigs from said heating means, and such that the rotational speed of said first rotor arms jig holders is substantially equal to the peripheral rotational speed of said second turntable when loading jigs to said piece blow-molding means;

a second transfer means located between said second and third turntables, comprising:
  a second rotor having arms with jig holders at the ends of the arms for transferring jigs from said piece blow-molding means to said piece loading-unloading means;
  a second cam unit driven by a continuous drive source for driving said second rotor to provide intrinsic rotation to said second rotor, converting constant rotating input from said drive source according to a predetermined speed variation curve, such that the rotational speed of said second rotor arms jig holders is substantially equal to the peripheral rotational speed of said second turntable when unloading jigs from said piece blow-molding means, and such that the rotational speed of said second rotor arms jig holders is substantially equal to the peripheral rotational speed of said third turntable when loading jigs to said piece loading-unloading means;

a third transfer means located between said first and third turntables, comprising:
  a third rotor having arms with jig holders at the ends of the arms for transferring jigs from said piece loading-unloading means to said heating means;
  a third cam unit driven by a continuous drive source for driving said third rotor to provide intrinsic rotation to said third rotor, converting constant rotating input from said drive source according to a predetermined speed variation curve, such that the rotational speed of the third rotor arms jig holders is substantially equal to the peripheral rotational speed of said third turntable when unloading jigs from said piece loading-unloading means, and such that the rotational speed of said third rotor arms jig holders is substantially equal to the peripheral rotational speed of said first turntable when loading jigs to said heating means;

said heating means further comprising a plurality of heating zones disposed within said heating chamber along the path of said jig holders, each heating zone comprising a plurality of heating rods, a heat exhausting damper and temperature detecting thermostats associated with damper drive means so as to control the temperatures of said heating zones;

said first, second and third turntables being driven by a continuous drive means so as to be continuously rotated at predetermined speeds in a predetermined relationship according to a predetermined speed curve such that each turntable simultaneously loads one jig from and unloads one jig to said first, second or third transfer means.

2. The heating blow-molding machine according to claim 1, wherein each of the jigs comprises a mandrel having high magnetic permeability to be magnetically attracted to be held to the jig holder assembled with said heating means, said piece loading and unloading means, or said first, second or third transfer means by means of magnetic attraction.

3. The heating blow-molding machine according to claim 1, wherein each of the jigs comprises an orientation core shaft elevationally movably disposed along the central axis thereof to be lifted by the lifting operation of an orientation pin of said blow molding means to axially orient the piece assembled with the jig, a core top of heat insulating material of inverted frusto-conical shape having an inverted tapered peripheral surface making contact with the bottom of the piece at axially orienting time, and splined groove-like openings perforated substantially over the entire length of the core shaft to communicate with the interior of the piece held by the jig.

4. The heating blow molding machine according to claim 1, wherein the heating rods consist of a plurality of lateral heating rods disposed at one side along the moving path of the jig holder at every heating zone in the heating chamber and a plurality of heating rods longitudinally disposed at the other side.

5. The heating blow molding machine according to claim 1, wherein the jig holder comprises further a rotatable central cylinder, a position controller for controlling the rotary position of the cylinder so that the inside surface of the supporting holder accurately is directed externally of the turntable of said heating means when loading the jig to the jig holder and unloading it from the jig holder.

6. The heating blow molding machine according to claim 1, wherein said blow molding means comprises a brake unit for directly braking the turntable thereof to shut off the power supply of the turntable drive source when the brake unit is operated.

7. A heating blow-molding machine as claimed in claim 1, wherein each turntable and each transfer means is driven by the same continuous drive source.

* * * * *